(12) United States Patent
Fujisawa

(10) Patent No.: US 6,373,790 B1
(45) Date of Patent: Apr. 16, 2002

(54) OVERCHARGE PREVENTION METHOD, CHANGING CIRCUIT, ELECTRONIC DEVICE AND TIMEPIECE

(75) Inventor: Teruhiko Fujisawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/462,798

(22) PCT Filed: May 18, 1999

(86) PCT No.: PCT/JP99/02582

§ 371 Date: Feb. 23, 2000

§ 102(e) Date: Feb. 23, 2000

(87) PCT Pub. No.: WO99/60684

PCT Pub. Date: Nov. 25, 1999

(30) Foreign Application Priority Data

May 18, 1998 (JP) .............................. 10-135720

(51) Int. Cl.⁷ .............................. G04C 3/00; H04J 7/04; H02H 7/10; H03K 17/687
(52) U.S. Cl. ........................ 368/204; 320/134; 320/162; 363/53; 327/494
(58) Field of Search ................................. 368/203, 204; 320/134, 132, 162, 137, 166; 363/52, 53, 56.02, 56.03, 127, 132; 327/494, 495–498, 531, 533, 540, 543, 587, 588

(56) References Cited

U.S. PATENT DOCUMENTS

| | | | |
|---|---|---|---|
| 3,808,514 A | * | 4/1974 | Wesemeyer .................. 320/137 |
| 4,388,582 A | * | 6/1983 | Saar et al. .................... 320/132 |
| 5,798,630 A | * | 8/1998 | Sugimori et al. ............ 320/137 |
| 6,130,831 A | * | 10/2000 | Matsunaga .................... 363/132 |
| 6,140,863 A | * | 10/2000 | Fujisawa ....................... 327/540 |

FOREIGN PATENT DOCUMENTS

| | | | |
|---|---|---|---|
| JP | 355023738 | * 2/1980 | .................. 327/494 |
| JP | 63-137541 | 9/1988 | |
| JP | 2-7834 | 1/1990 | |
| JP | 4-138030 | 5/1992 | |

* cited by examiner

Primary Examiner—Diego Gutierrez
Assistant Examiner—Jeanne-Marguerite Goodwin
(74) Attorney, Agent, or Firm—Mark P. Watson

(57) ABSTRACT

In an overcharge prevention method for a voltage storage element connected to a bridge rectifier circuit which includes a first switching section connected between one input terminal supplied with an AC voltage and a first power source line, a second switching section connected between the other input terminal supplied with the AC voltage and the first power source line, a third switching section connected between the one input terminal and a second power source line, and a fourth switching section connected between the other input terminal and the second power source line, both the first and second switching sections or both the third and fourth switching sections are concurrently turned on, forming a closed loop path between the one input terminal and the other input terminal, and thus the charge voltage at the voltage storage element is prevented from exceeding a withstand voltage of the voltage storage element, and the overcharging of the voltage storage element is avoided. Furthermore, since the voltage storage element is not shorted, no short-circuit current occurs, power stored in the voltage storage element is prevented from being consumed in vain, and the voltage storage element and a driven circuit are free from damage. Since a closed loop path, different from a charging path, is formed to allow a generated current to flow therethrough in order to prevent overcharge of the voltage storage element, circuit elements having low withstand voltages may be employed, facilitating the integration of the circuit. Since the closed loop path, formed between two input terminals corresponding to the two output terminals of a generator, applies short-circuit braking to the rotation of a rotor in the generator, the amplitude of a terminal voltage is automatically lowered, and the generation of electromagnetic noise in coils and the rotor in the generator is controlled.

53 Claims, 20 Drawing Sheets

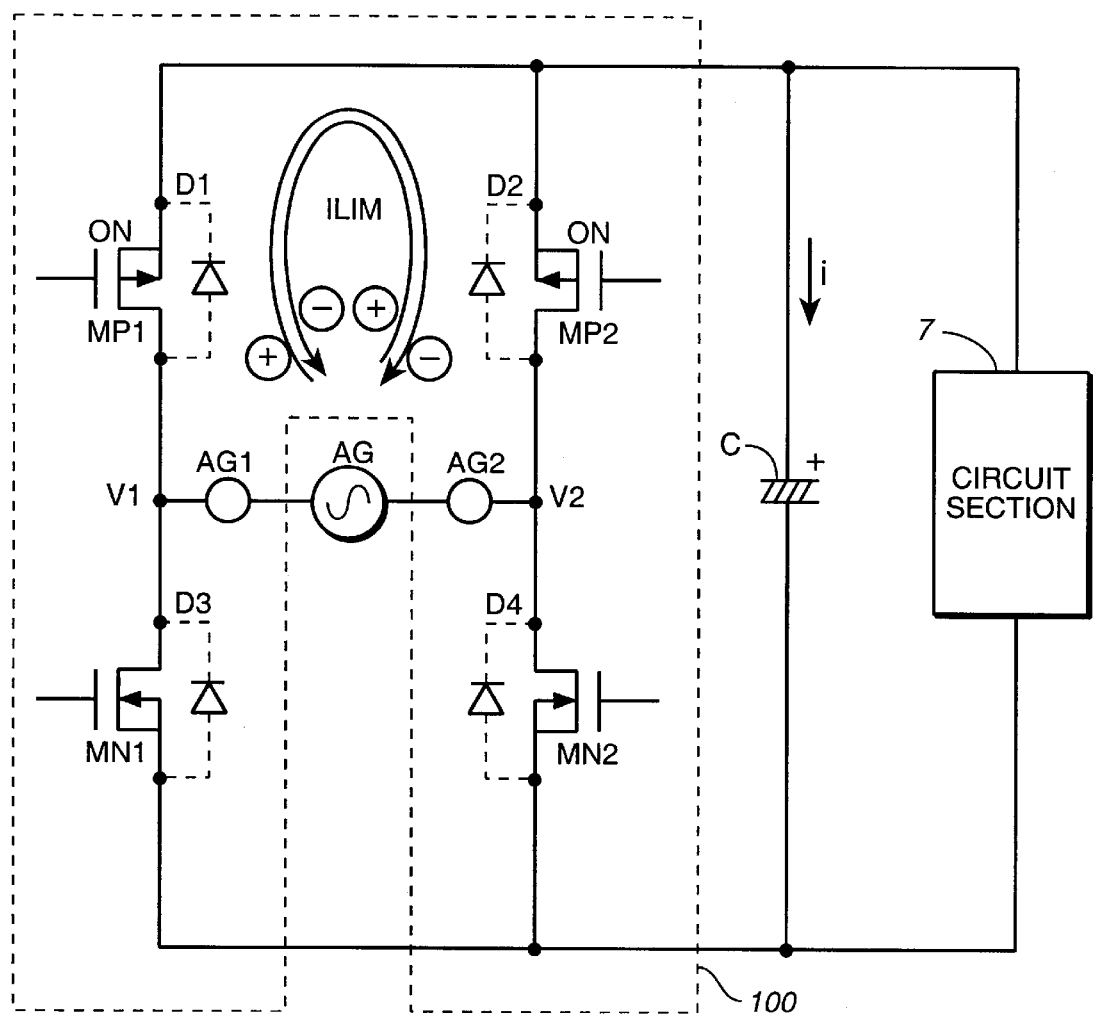
FIG._1
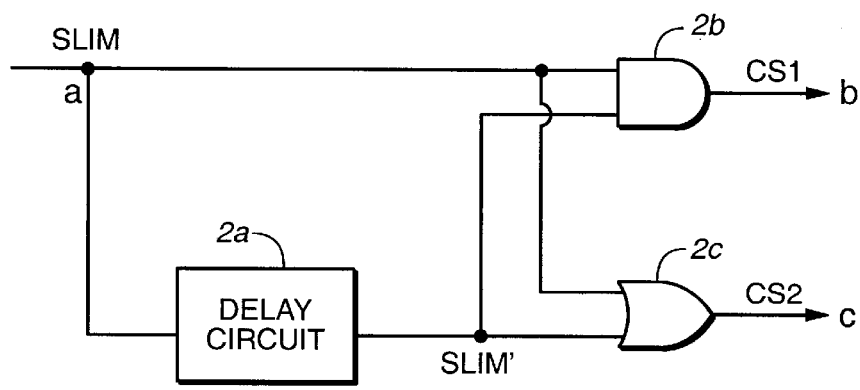
FIG._4

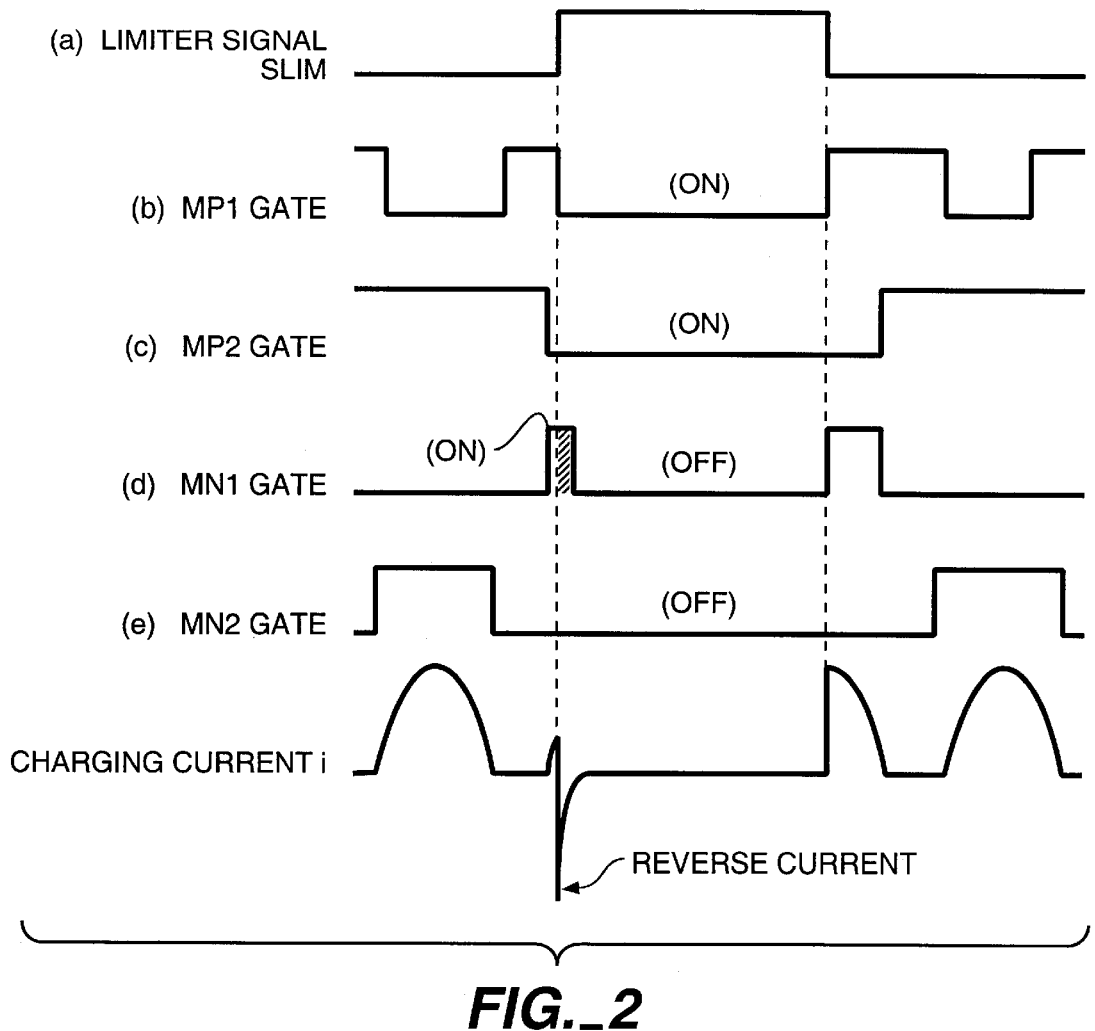
FIG._2

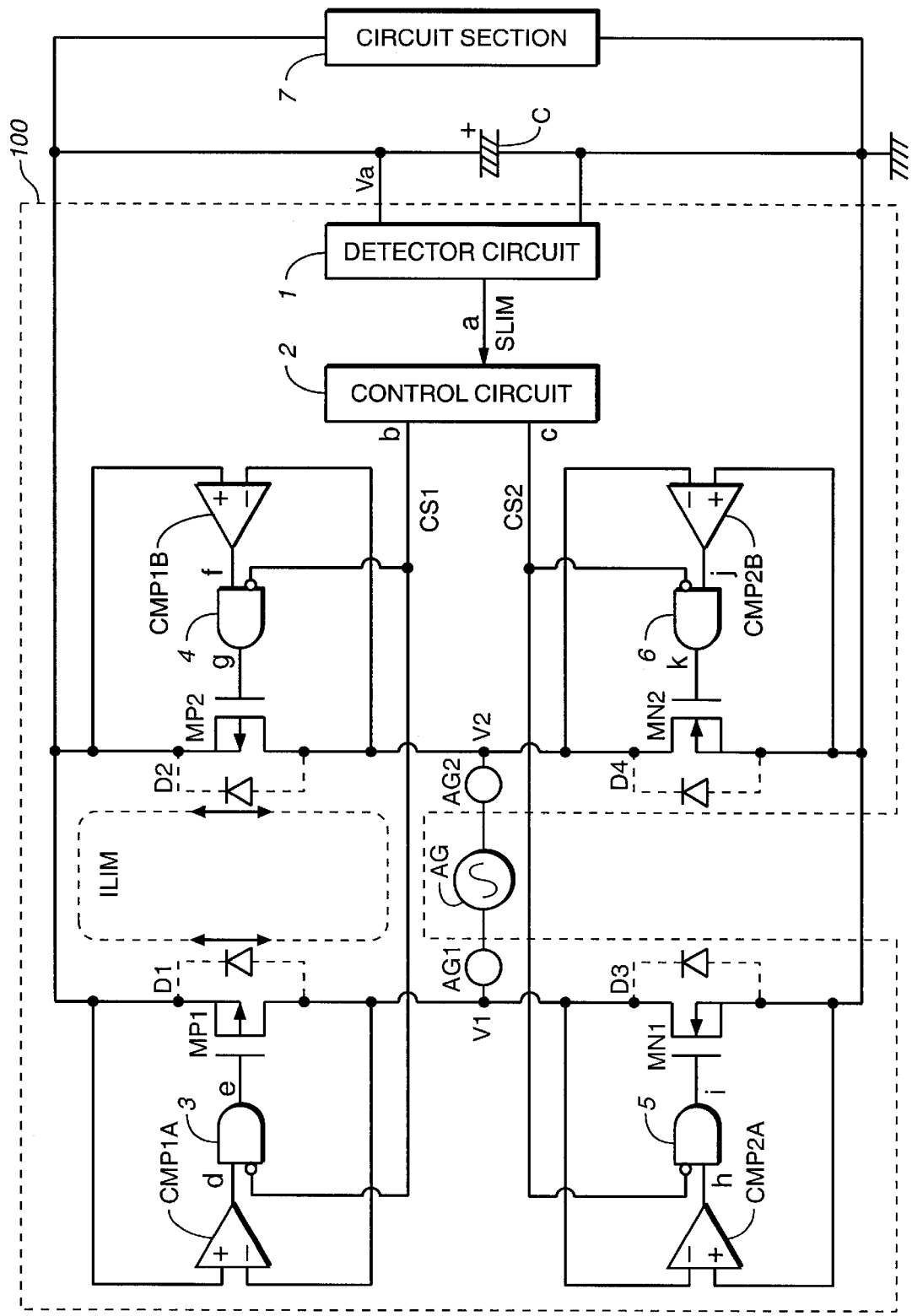
FIG._3

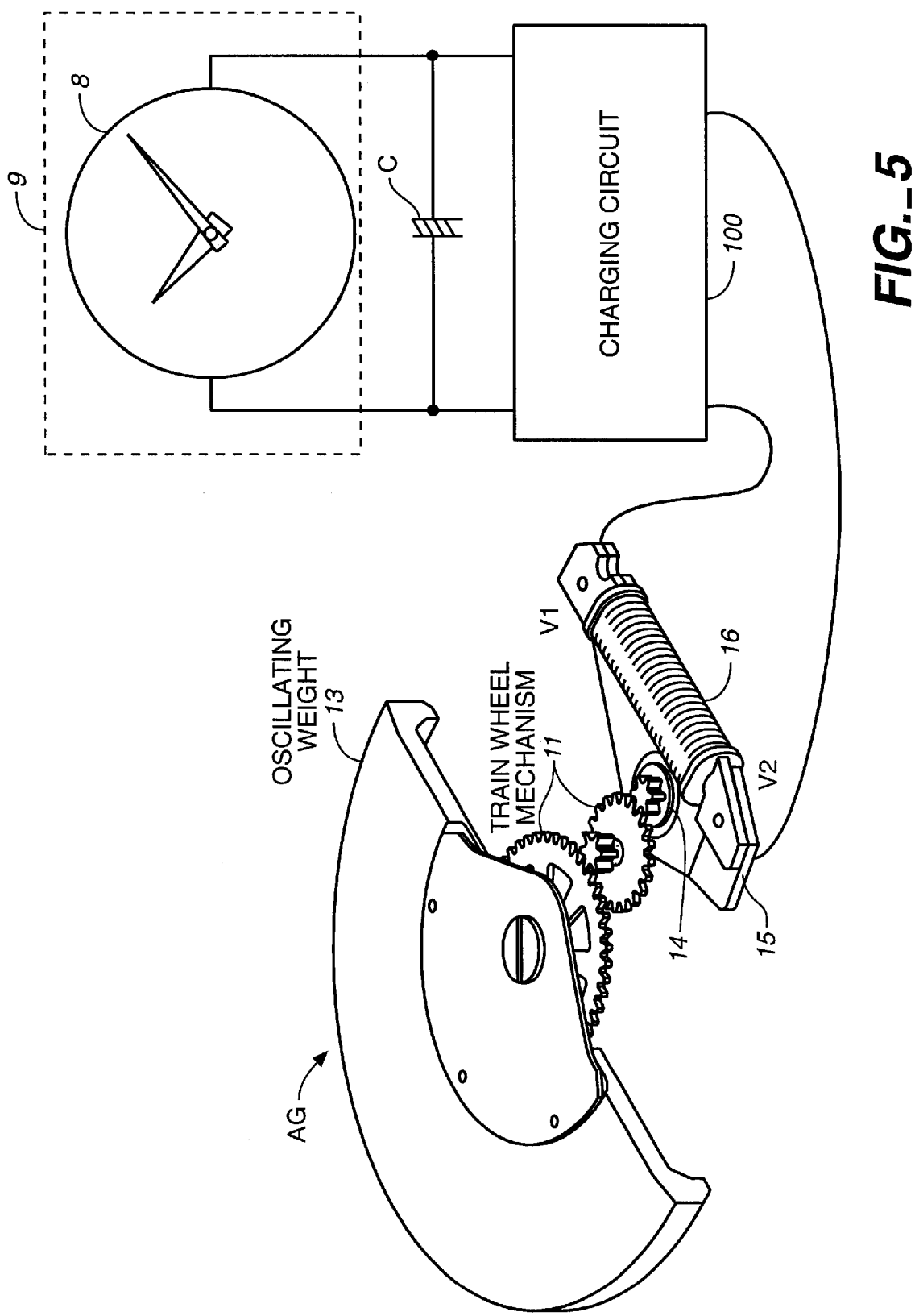
FIG._5

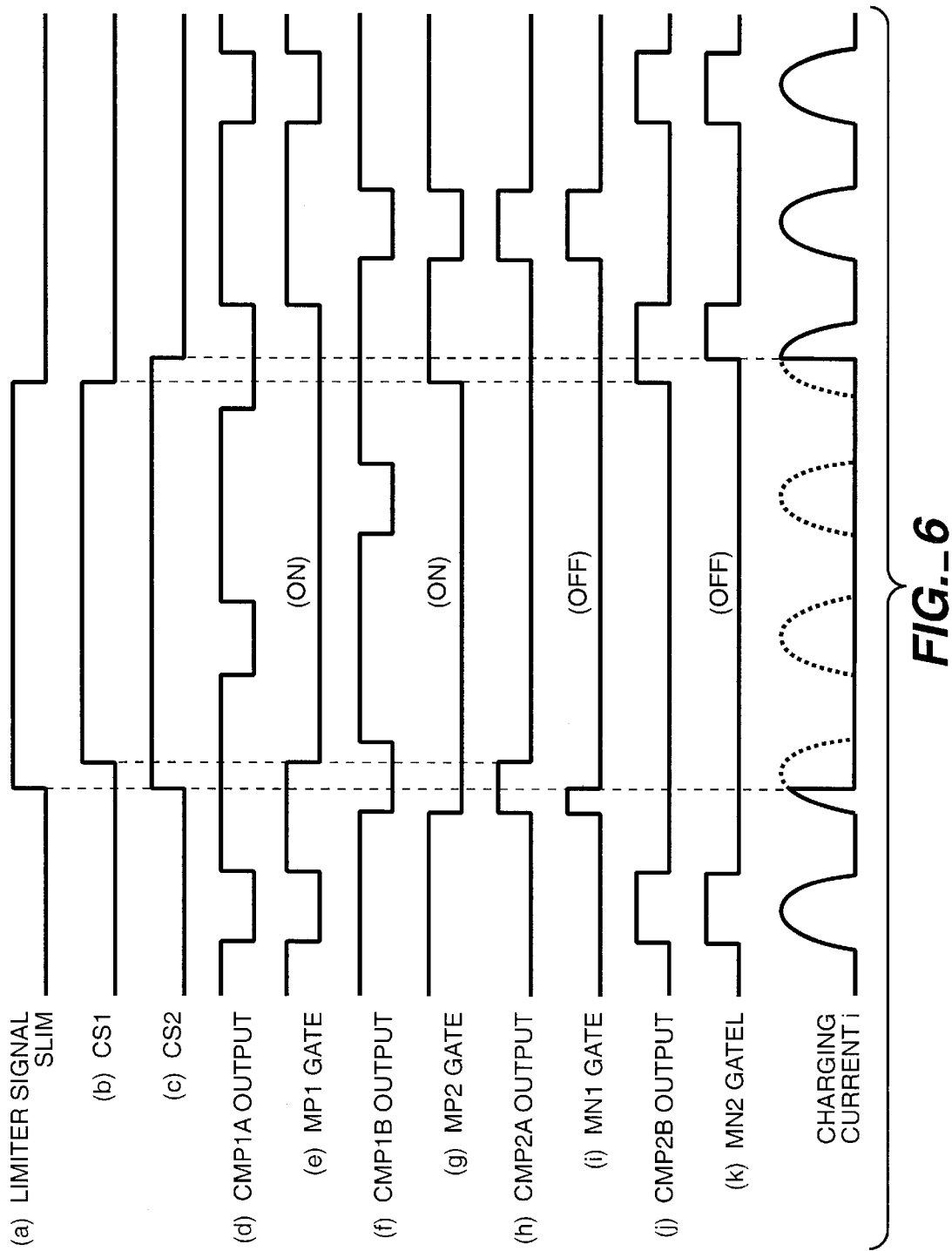
FIG._6

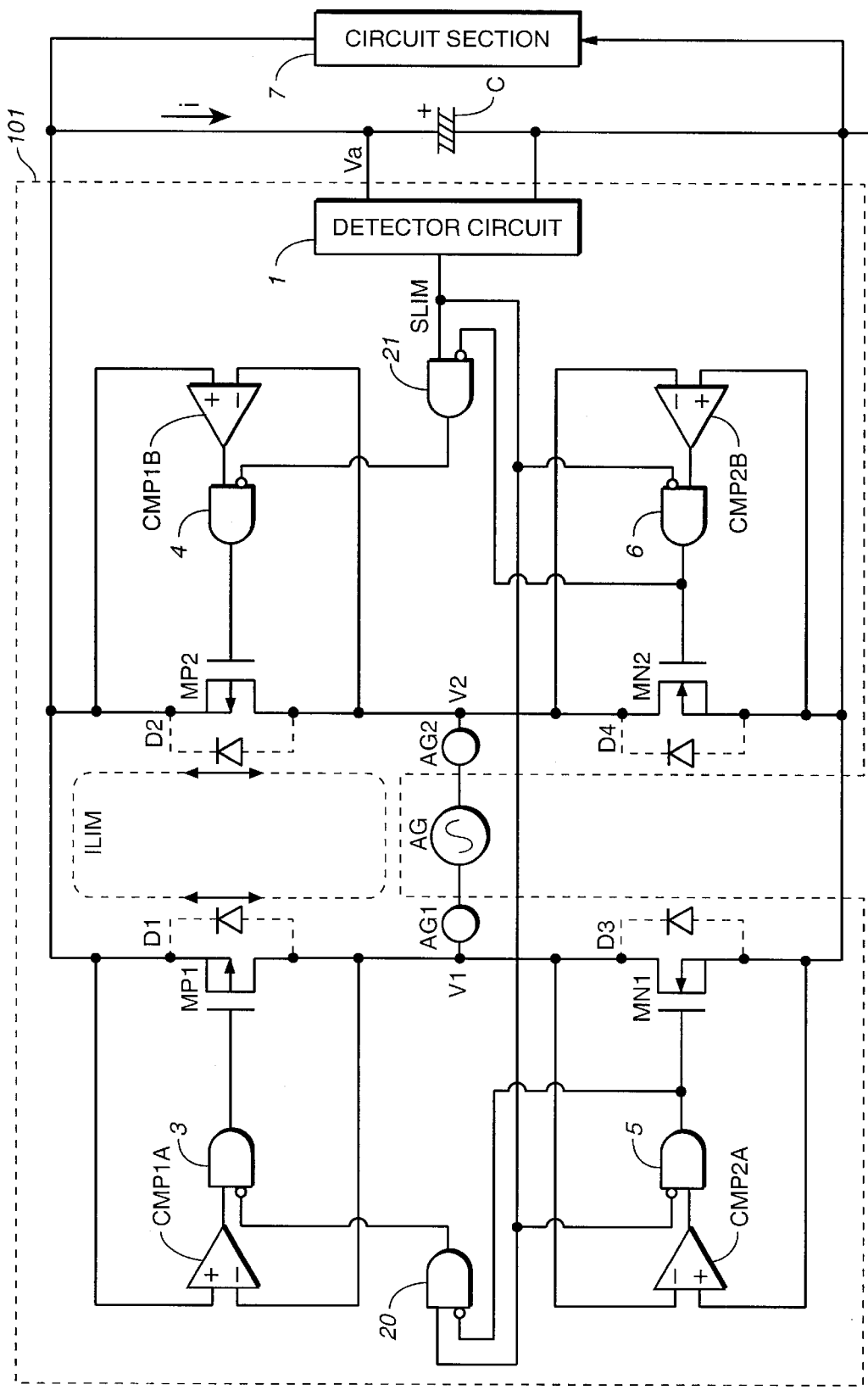
FIG._7

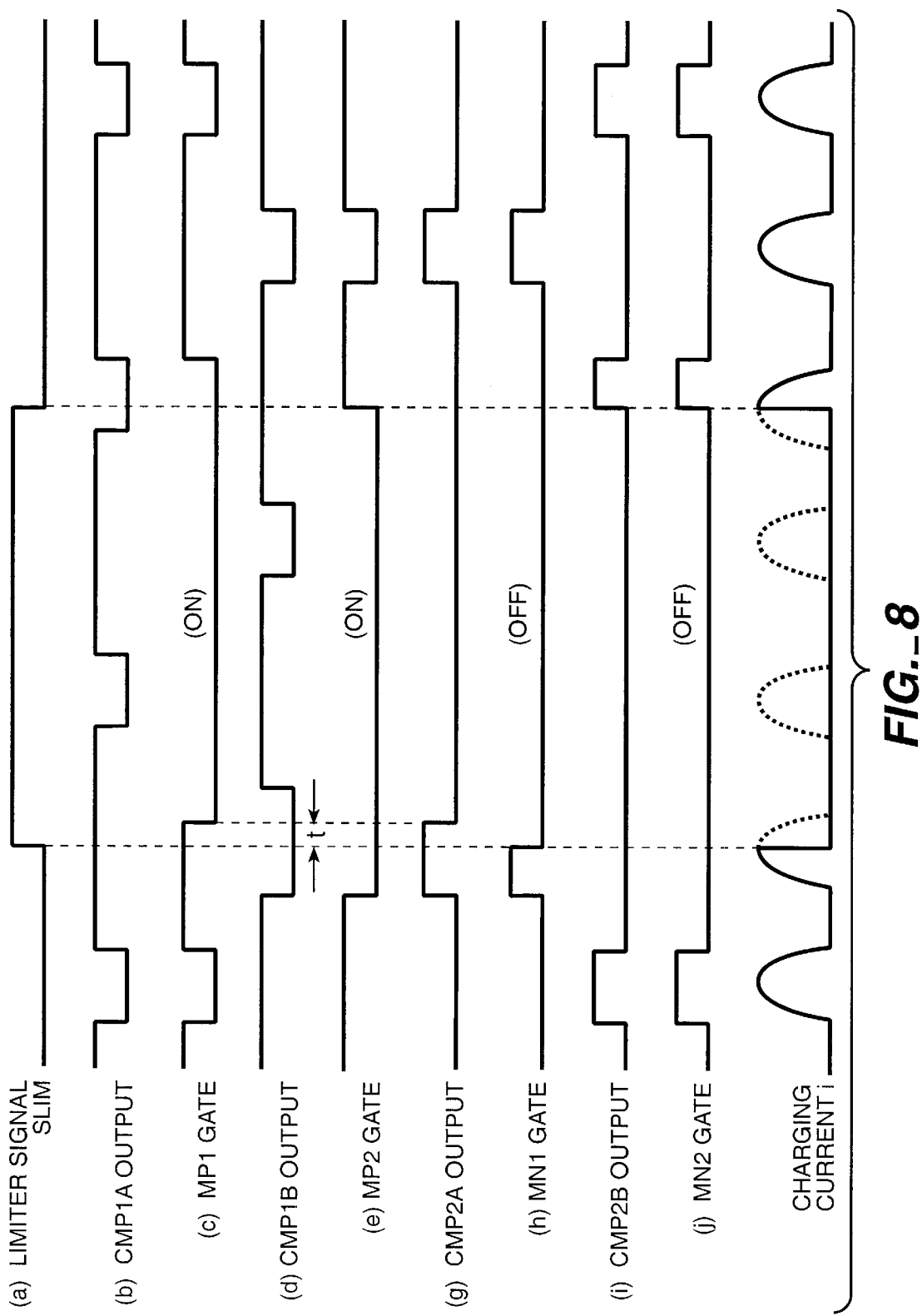
FIG._8

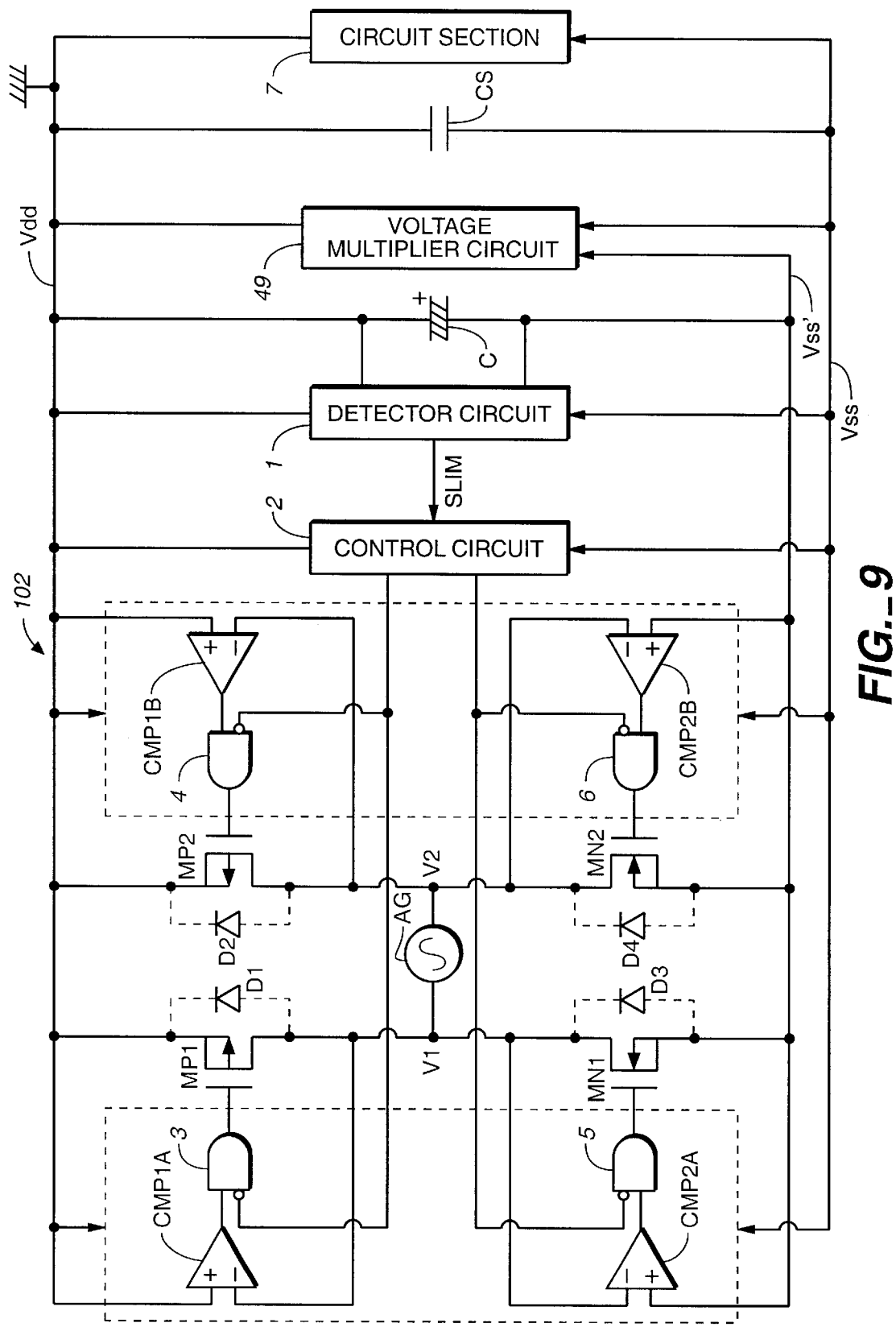
FIG._9

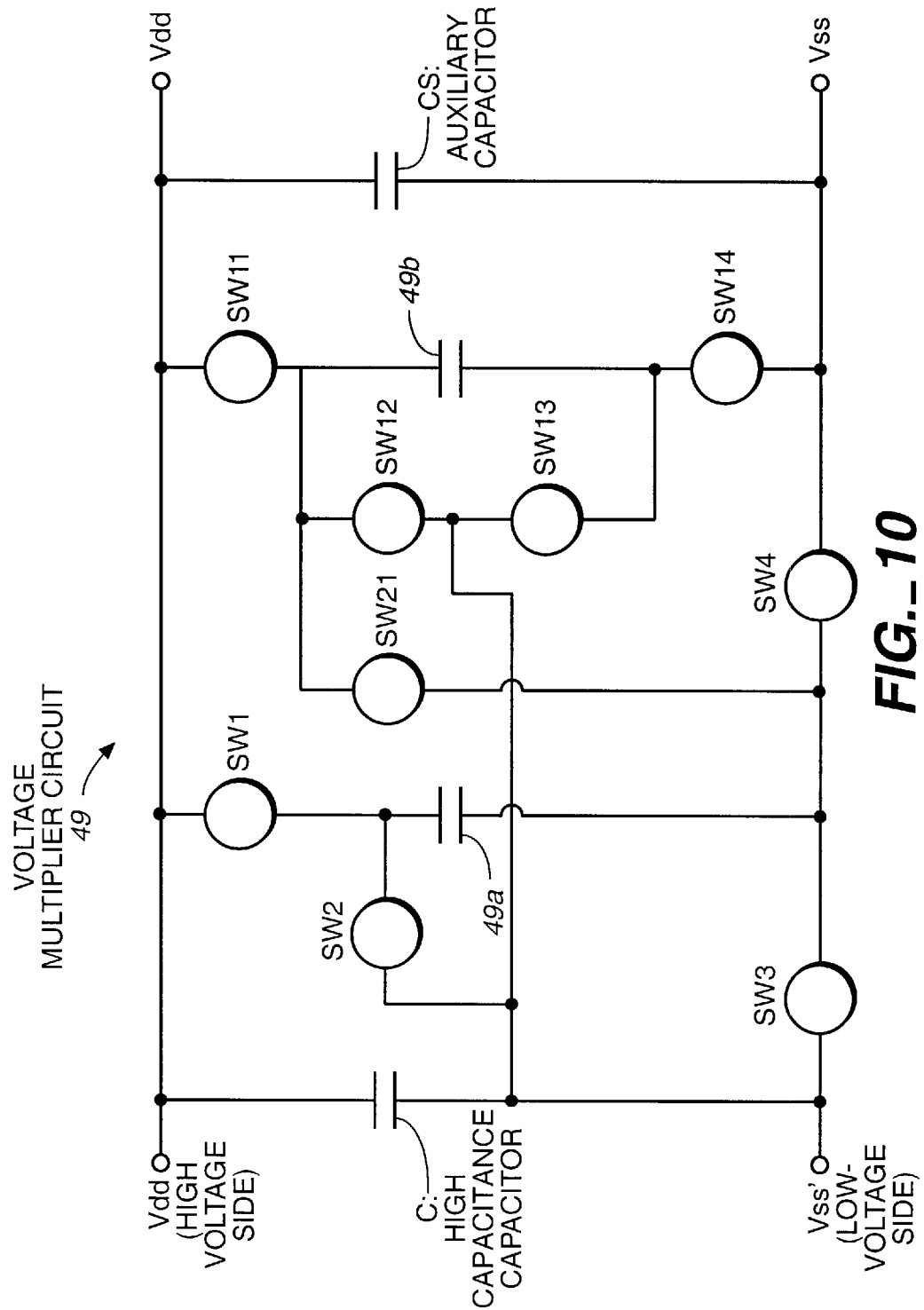
FIG._10

| VOLT. MULTIPLICATION RATE | CONNECTION METHOD | SW1 | SW2 | SW3 | SW4 | SW11 | SW12 | SW13 | SW14 | SW21 |
|---|---|---|---|---|---|---|---|---|---|---|
| 3 | PARALLEL | ON | OFF | ON | OFF | ON | OFF | ON | OFF | OFF |
| 3 | SERIAL | OFF | ON | OFF | OFF | OFF | OFF | OFF | ON | ON |
| 2 | PARALLEL | ON | OFF | ON | OFF | ON | OFF | ON | OFF | OFF |
| 2 | SERIAL | OFF | ON | OFF | ON | OFF | OFF | OFF | ON | OFF |
| 1.5 | PARALLEL | ON | OFF | OFF | ON | OFF | ON | ON | OFF | ON |
| 1.5 | SERIAL | OFF | ON | ON | ON | OFF | ON | OFF | ON | OFF |
| NO VOLTAGE MULTIPLICATION (DIRECT CONNECTION) | PARALLEL | OFF | ON | ON | ON | OFF | ON | ON | ON | OFF |
| NO VOLTAGE MULTIPLICATION (DIRECT CONNECTION) | SERIAL | OFF | ON | ON | ON | OFF | ON | ON | ON | OFF |

*FIG._11*

VOLTAGE TRIPLED
(a) PARALLEL CONNECTION  (b) SERIAL CONNECTION
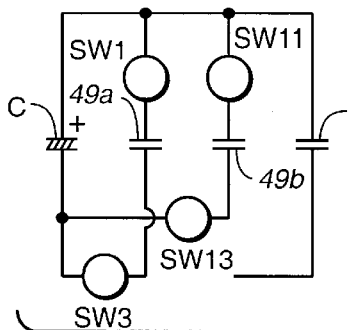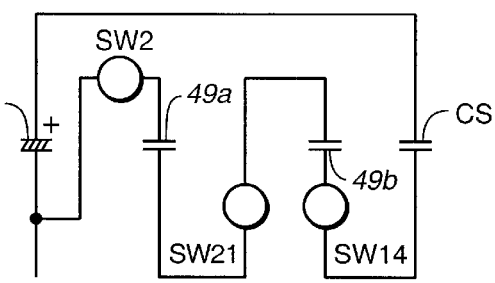
FIG._12
VOLTAGE DOUBLED
(a) PARALLEL CONNECTION  (b) SERIAL CONNECTION
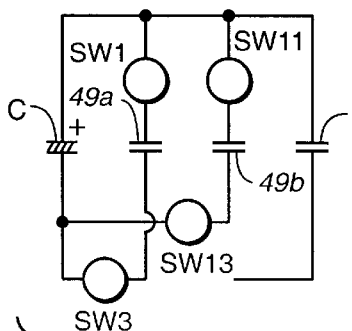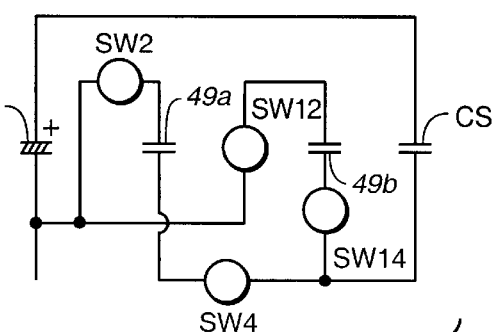
FIG._13
VOLTAGE 1.5-TIMES MULTIPLIED
(a) PARALLEL CONNECTION  (b) SERIAL CONNECTION
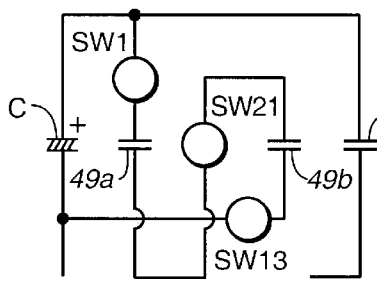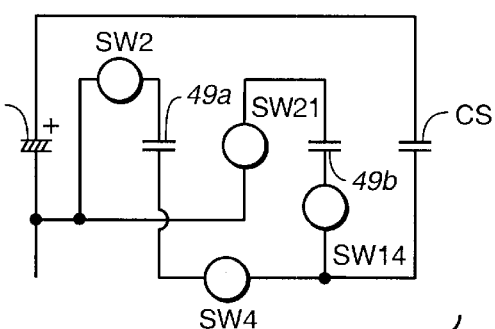
FIG._14

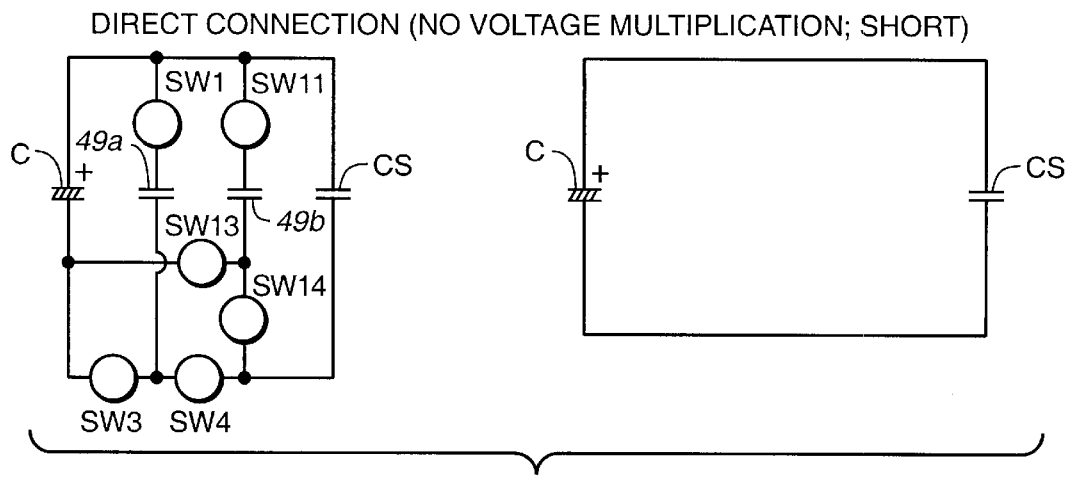
FIG._15
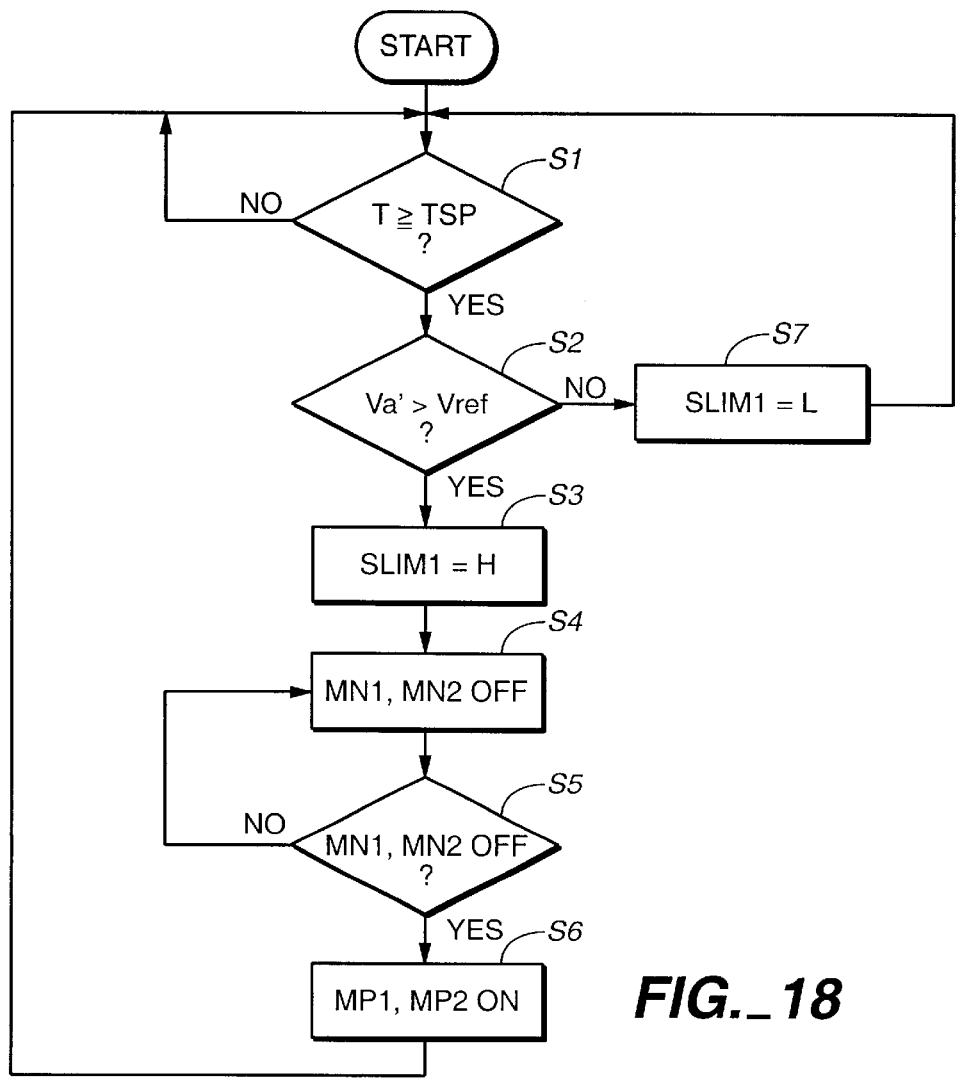
FIG._18

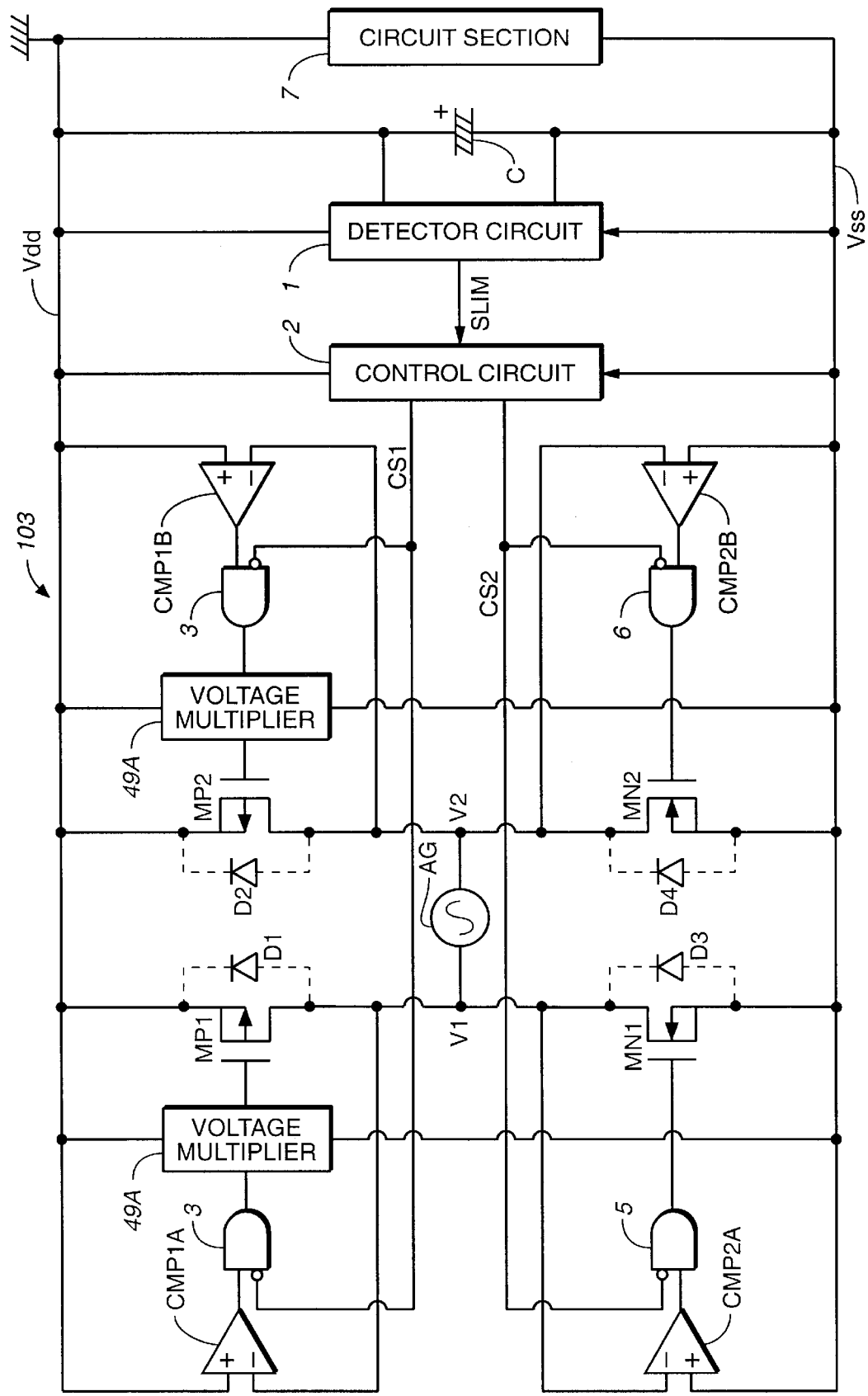
FIG._16

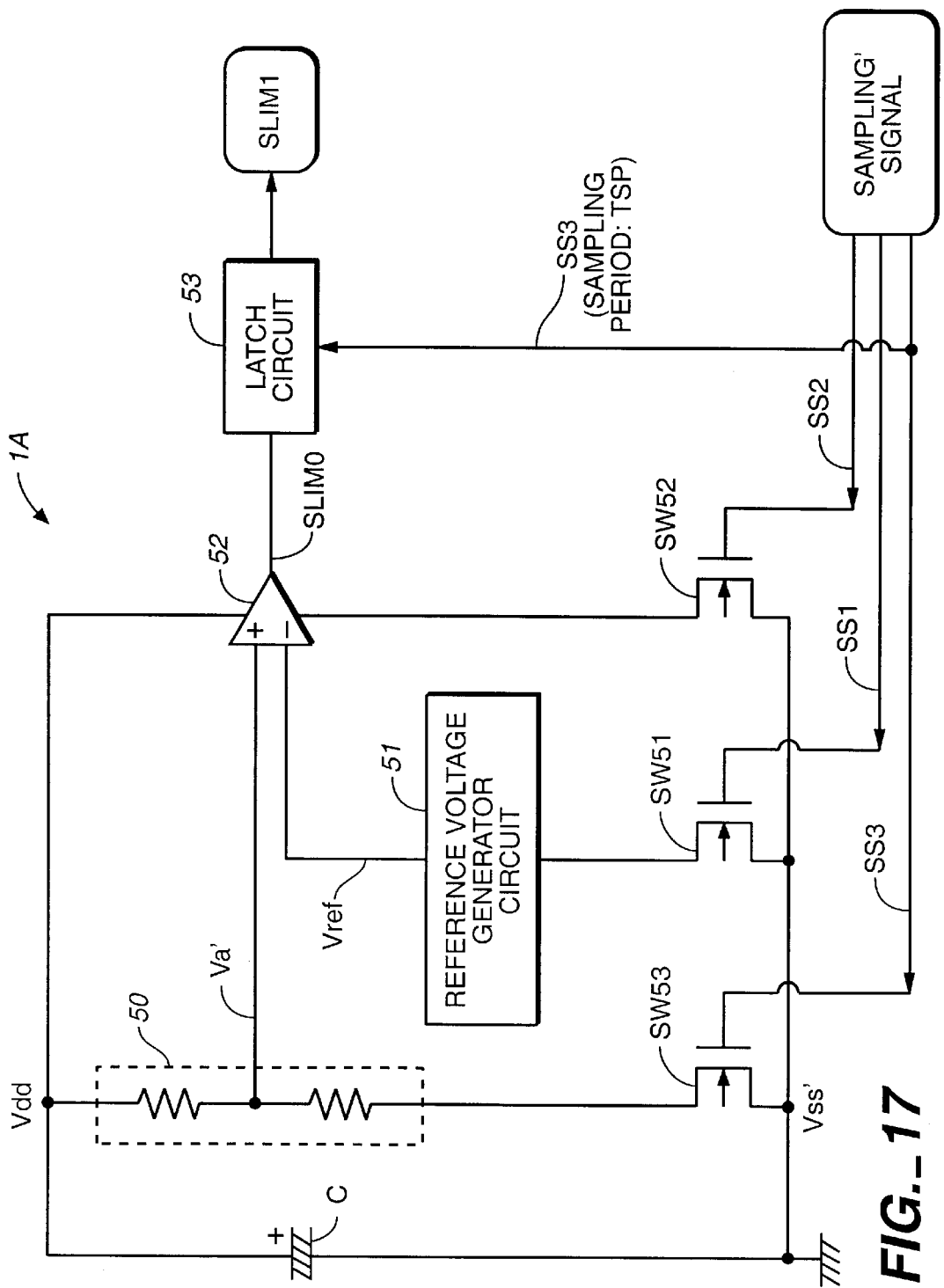
FIG._17

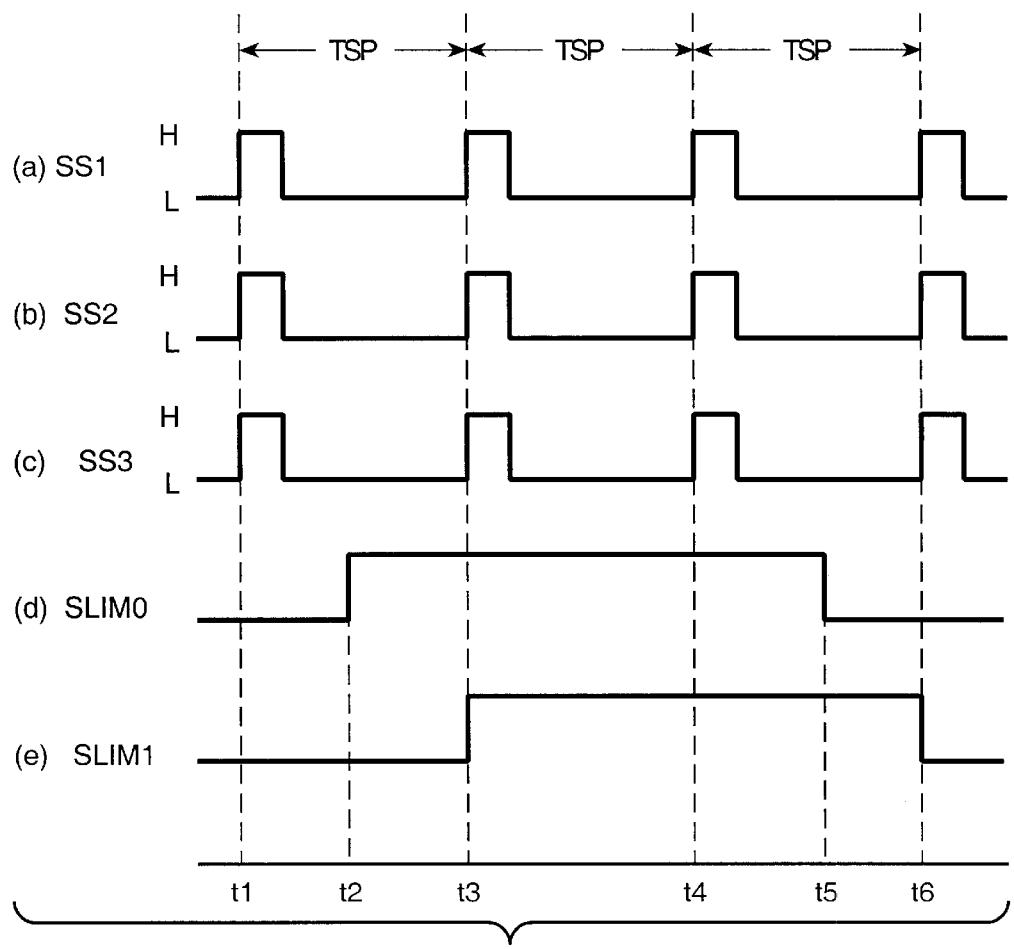
FIG._19

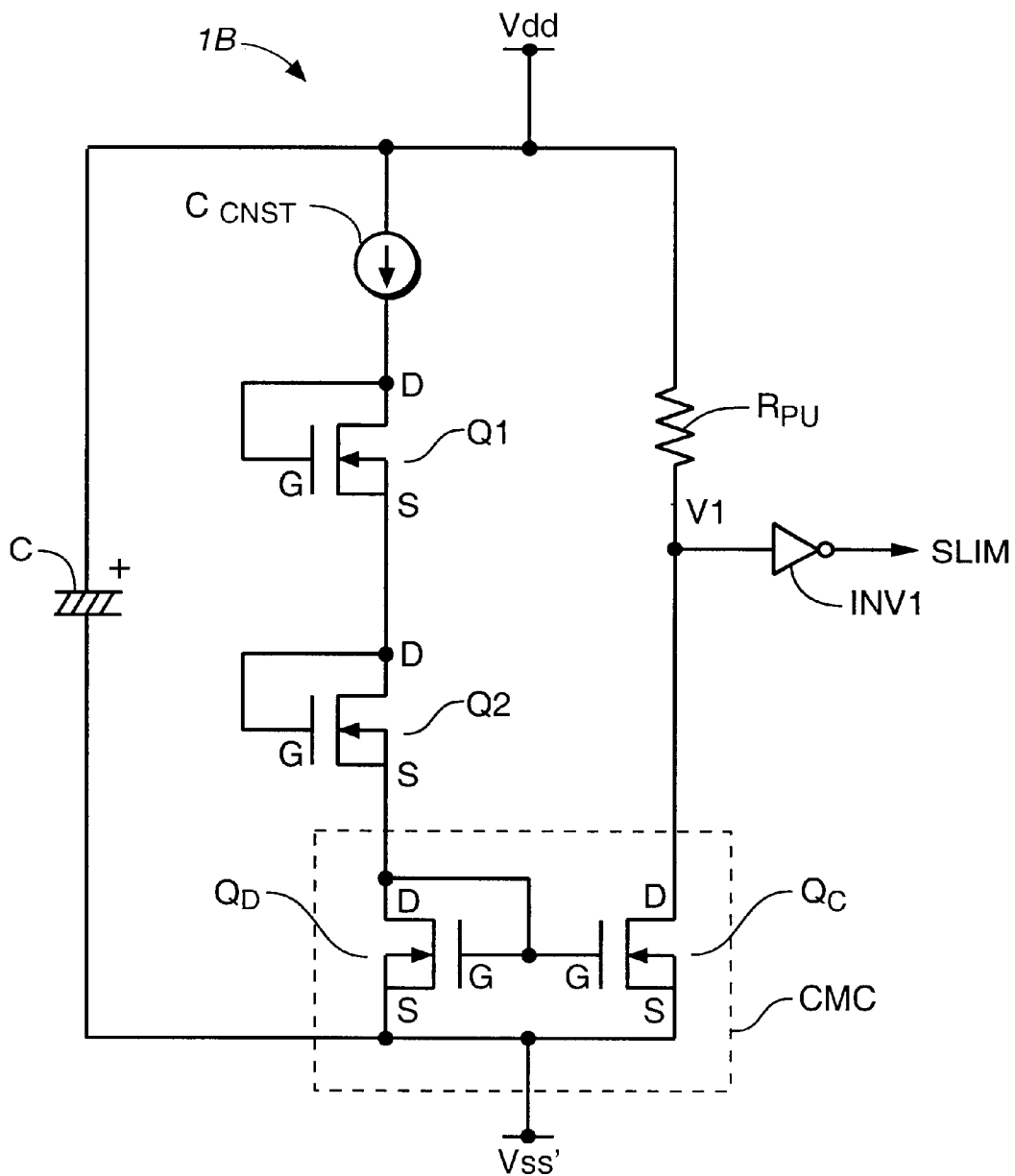
FIG._20

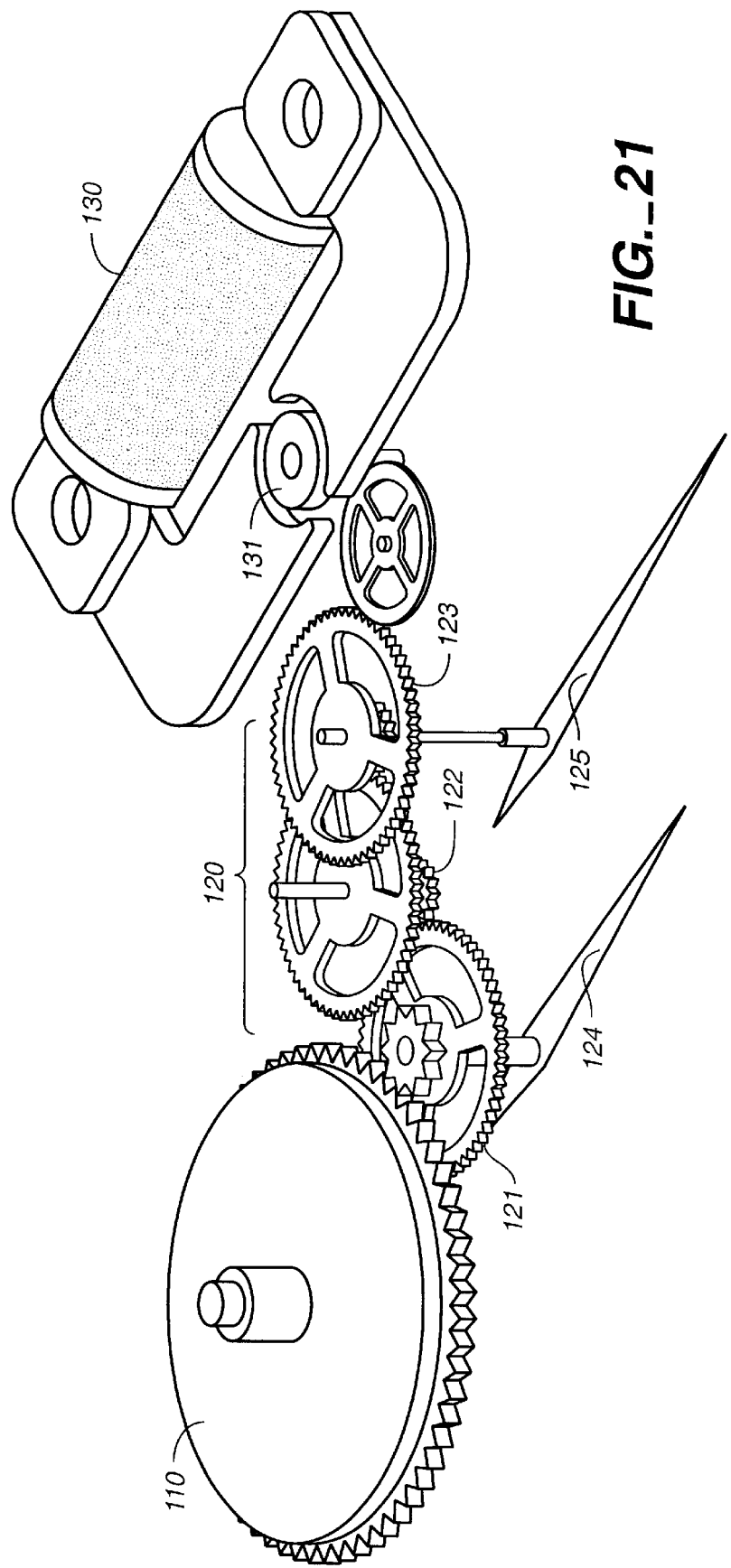
FIG._21

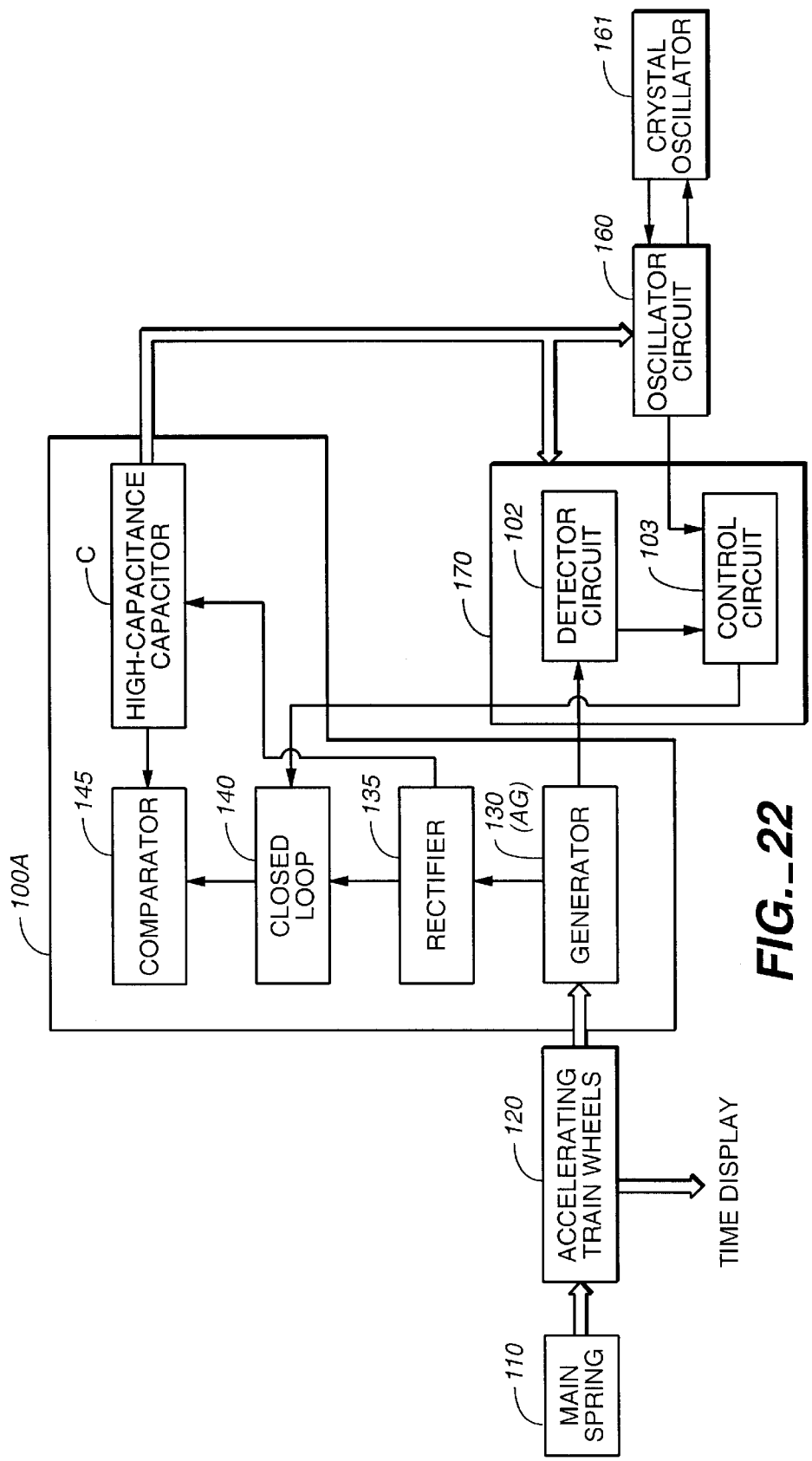
FIG._22

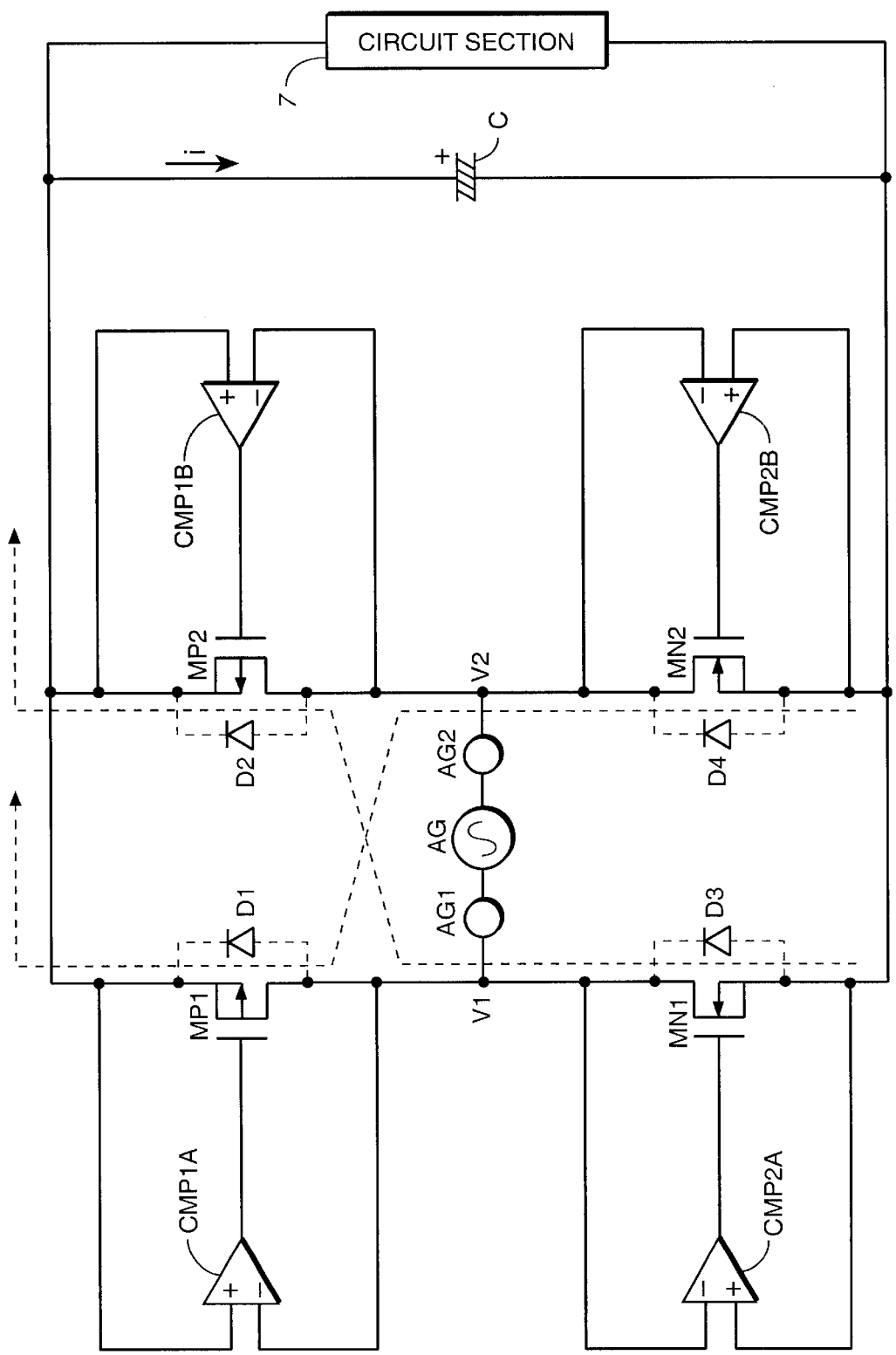
FIG._23 (PRIOR ART)

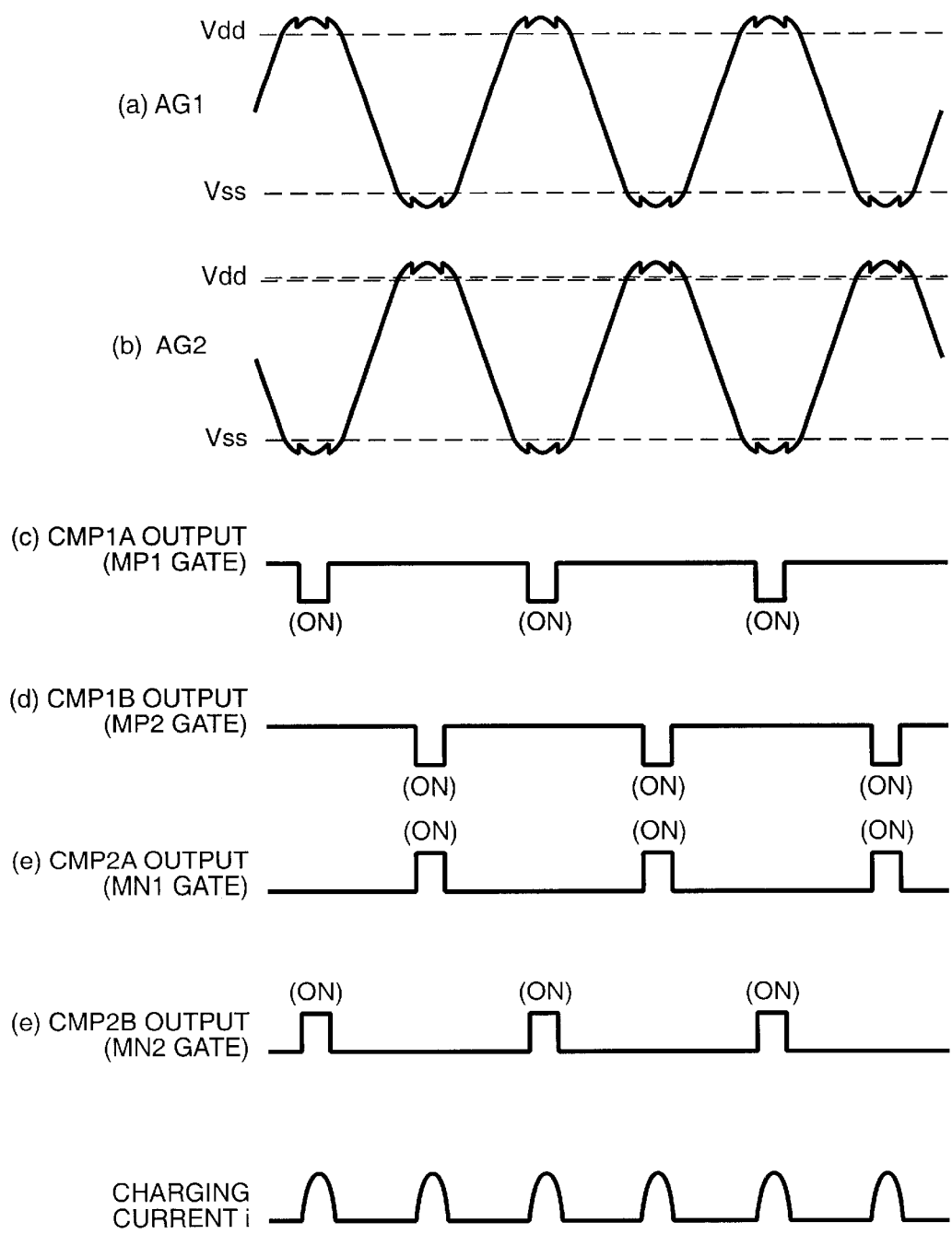
FIG._24

US 6,373,790 B1

OVERCHARGE PREVENTION METHOD, CHANGING CIRCUIT, ELECTRONIC DEVICE AND TIMEPIECE

TECHNICAL FIELD

The present invention relates to an overcharge prevention method and a charging circuit, suitable for preventing overcharge, and an electronic device and a timepiece, employing the overcharge prevention method and the charging circuit. This invention relates generally to a

BACKGROUND ART

In a charging circuit for charging a voltage storage device, such as a high-capacitance capacitor or a secondary battery, with an AC voltage generated by a generator, a diode-bridge circuit is typically employed as a rectifier circuit for full-wave rectifying the AC voltage. However, the diode-bridge circuit suffers from a loss due to a voltage drop through two diodes.

A compact and portable electronic device, such as a wristwatch, which employs a generator generating a small-amplitude AC voltage, is affected much by the loss through the diode-bridge circuit, and using the diode-bridge circuit as a rectifier circuit is not appropriate.

In view of the above problem, a synchronous rectifier circuit using transistors, rather than a diode, has been proposed.

FIG. 23 is a circuit diagram showing one example of a charging circuit employing a conventional synchronous rectifier circuit.

As shown in FIG. 23, the charging circuit includes comparators CMP1A and CMP1B, comparators CMP2A and CMP2B, P-channel FETs MP1 and MP2, N-channel FETs MN1 and MN2, and a high-capacitance capacitor C (charged device) for storing a charging current.

The comparator CMP1A compares an output voltage V1 at an input terminal AG1 connected to a generator AG with a source voltage Vdd. The comparator CMP1B compares an output voltage V2 at an input terminal AG2 connected to the generator AG with the source voltage Vdd.

The comparator CMP2A compares the output voltage V1 at the input terminal AG1 with a source voltage Vss. The comparator COM2B compares the output voltage V2 at the input terminal AG2 with the source voltage Vss.

The P-channel FET MP1 is turned on and off under the control of the comparator CMP1A, and the P-channel FET MP2 is turned on and off under the control of the comparator CMP1B.

The N-channel FET MN1 is turned on and off under the control of the comparator CMP2A, and the N-channel FET MN2 is turned on and off under the control of the comparator CMP2B.

D1–D4 are MOSFET parasitic diodes.

FIG. 24 is a timing diagram illustrating the operation of the above-referenced charging circuit.

The generator AG respectively outputs, at the input terminals AG1 and AG2, the output voltages V1 and V2 between which a phase difference of 180° occurs. The P-channel FET MP1 is turned on by the comparator COM1A when the output voltage V1 of the generator AG becomes equal to or higher than the source voltage Vdd.

The N-channel FET MN2 is turned on by the comparator COM2B when the output voltage V2 of the generator AG becomes equal to or lower than the source voltage Vss.

Similarly, the P-channel FET MP2 is turned on by the comparator COM1B when the output voltage V2 of the generator AG becomes equal to or higher than the source voltage Vdd, and the N-channel FET MN1 is turned on by the comparator COM2A when the output voltage V1 of the generator AG becomes equal to or lower than the source voltage Vss.

A charging current i flows from the generator AG through arrow-headed paths into the high-capacitance capacitor C, charging the high-capacitance capacitor C, when both the P-channel FET MP1 and the N-channel FET MN2 are on, and when both the P-channel FET MP2 and the N-channel FET MN1 are on. In this way, the synchronous rectifier circuit employing the transistors performs full-wave rectification.

In such a charging circuit, when the charging voltage for the high-capacitance capacitor C exceeds a predetermined voltage, an overcharge state occurs, degrading the charging circuit and dropping its charging efficiency.

The present invention has been developed in view of the above problem, and it is an object of the present invention to provide an overcharge prevention method, a charging circuit, an electronic device and a timepiece, for preventing overcharge and for preventing a shortcircuit of a voltage storage element associated with an overcharge prevention step.

DISCLOSURE OF THE INVENTION

According to a first aspect of the present invention, in an overcharge prevention method for a voltage storage element connected to a bridge rectifier circuit including a first switching section connected between one input terminal supplied with an AC voltage and a first power source line, a second switching section connected between the other input terminal supplied with the AC voltage and the first power source line, a third switching section connected between the one input terminal and a second power source line, and a fourth switching section connected between the other input terminal and the second power source line, both the first and second switching sections or both the third and fourth switching sections are concurrently turned on, forming a closed loop path between the one input terminal and the other input terminal.

In the present invention, the first and second switching sections are P-channel MOSFETs while the third and fourth switching sections are N-channel MOSFETs.

In the present invention, an overcharge prevention method is used in a charging circuit which rectifies an AC voltage supplied to input terminals to charge a voltage storage element with power, wherein the charging circuit includes a first comparator section for comparing a terminal voltage at one input terminal supplied with the AC voltage with an output voltage at a first power source line, a first switching section, which is connected between the first power source line and the one input terminal, and is turned on and off under the control of the first comparator section, a second comparator section for comparing a terminal voltage at the other input terminal with the output voltage at the first power source line, a second switching section, which is connected between the first power source line and the other input terminal, and is turned on and off under the control of the second comparator section, a third comparator section for comparing the terminal voltage supplied to the one terminal with an output voltage at a second power source line, a third switching section, which is connected between the second power source line and the one input terminal, and is turned on and off under the control of the third comparator section, a fourth comparator section for comparing the terminal voltage supplied to the other input terminal with the output voltage at the second power source line, a fourth switching section, which is connected between the second power source line and the other input terminal, and is turned on and off under the control of the fourth comparator section, and the voltage storage element connected between the first power source line and the second power source line. The overcharge prevention method includes a detecting step for detecting the voltage charged at the voltage storage element, a determining step for determining whether the detected charge voltage exceeds a predetermined voltage, a turning step for turning off the first and second switching sections or the third and fourth switching sections, when the charge voltage exceeds the predetermined voltage, and a forming step for forming a closed loop path between the one input terminal and the other input terminal, by concurrently turning on the first and second switching sections or the third and fourth switching sections.

In the present invention, the determining step for determining whether the detected charge voltage exceeds the predetermined voltage includes a comparing step for comparing the charge voltage with a reference voltage, with the predetermined voltage being the reference voltage.

In the present invention, in the forming step for forming the closed loop path, both the first and second switching sections are turned on.

In the present invention, in the forming step for forming the closed loop path, the first and second switching sections are turned on, subsequent to turning off the third and fourth switching sections.

In the present invention, an overcharge prevention method includes a step for returning the third and fourth switching sections to a normal charging operation, subsequent to returning the first and second switching sections, when the first through fourth switching sections are returned to the normal charging operation.

In the present invention, in the forming step for forming the closed loop path, the first and second switching sections are turned on with the third and fourth switching sections remaining in an off state.

In the present invention, in the forming step for forming the closed loop path, the third and fourth switching sections are turned on.

In the present invention, in the forming step for forming the closed loop path, the third and fourth switching sections are turned on, subsequent to turning off the first and second switching sections.

In the present invention, an overcharge prevention method according includes a step for returning the first and second switching sections to a normal charging operation, subsequent to returning the third and fourth switching sections, when the first through fourth switching sections are returned to a normal charging operation.

In the present invention, in the forming step for forming the closed loop path, the third and fourth switching sections are turned on with the first and second switching sections remaining in an off state.

In the present invention, in the detecting step for detecting the voltage charged at the voltage storage element, the detection of the charge voltage is intermittently performed at a predetermined sampling period.

According to a second aspect of the present invention, a charging circuit includes first switching means connected between one input terminal supplied with an AC voltage and a first power source line, second switching means connected between the other input terminal supplied with the AC voltage and the first power source line, third switching means connected between the one input terminal and the second power source line, fourth switching means connected between the other input terminal and the second power source line, a voltage storage element connected to a bridge rectifier circuit including the first switching means, the second switching means, the third switching means, and the fourth switching means, and closed loop forming means for forming a closed loop path between the one input terminal and the other input terminal, by concurrently turning on the first and second switching means or the third and fourth switching means.

In the present invention, the closed loop forming means concurrently turns on the first and second switching means subsequent to turning off the third and fourth switching means, or turns on the third and fourth switching means subsequent to turning off the first and second switching means.

A charging circuit, for charging a voltage storage element arranged between a first power source line and a second power source line, with charge, by rectifying an AC voltage supplied between first and second input terminals, includes first comparator means for comparing a terminal voltage supplied to a first input terminal with an output voltage at a first power source line, first switching means, which is connected between the first power source line and the first input terminal, and is turned on and off under the control of the first comparator means, second comparator means for comparing a terminal voltage supplied to a second input terminal with the output voltage at the first power source line, second switching means, which is connected between the first power source line and the second input terminal, and is turned on and off under the control of the second comparator means, third comparator means for comparing the terminal voltage supplied to the first input terminal with an output voltage at a second power source line, third switching means, which is connected between the second power source line and the first input terminal, and is turned on and off under the control of the third comparator means, fourth comparator means for comparing the terminal voltage supplied to the second input terminal with the output voltage at the second power source line, fourth switching means, which is connected between the second power source line and the second input terminal, and is turned on and off under the control of the fourth comparator means, a voltage storage element, which is connected between the first power source line and the second power source line, and is charged with a charging current rectified through the first through fourth switching means, predetermined voltage comparator means, which detects a voltage charged at the voltage storage element and determines whether the detected charge voltage exceeds a predetermined voltage, and closed loop forming means which forms a closed loop path between the first input terminal and the second input terminal by turning off the third and fourth switching means and by turning on the first and second switching means, in response to the detection result by the predetermined voltage comparator means.

In the present invention, the predetermined voltage comparator means, regarding the predetermined voltage as a reference voltage, detects whether the charge voltage exceeds the reference voltage.

The closed loop forming means of the present invention includes first control signal generating means for generating a first control signal for turning on the first and second switching means when the predetermined voltage comparator means detects that the charge voltage exceeds the predetermined voltage, second control signal generating means for generating a second control signal for turning off the third and fourth switching means prior to turning on the first and second switching means, first gating means, connected between the first comparator means and the first switching means, for turning on the first switching means in response to the first control signal, second gating means, connected between the second comparator means and the second switching means, for turning on the second switching means in response to the first control signal, third gating means, connected between the third comparator means and the third switching means, for turning off the third switching means in response to the second control signal, and fourth gating means, connected between the fourth comparator means and the fourth switching means, for turning off the fourth switching means in response to the second control signal.

The closed loop forming means of the present invention further includes control signal generating means for generating a control signal for turning on the first and second switching means and for turning off the third and fourth switching means, when the predetermined voltage comparator means detects that the charge voltage exceeds the predetermined voltage, first gating means, connected between the first comparator means and the first switching means, for turning on the first switching means in response to the control signal, second gating means, connected between the second comparator means and the second switching means, for turning on the second switching means in response to the control signal, third gating means, connected between the third comparator means and the third switching means, for turning off the third switching means in response to the control signal, fourth gating means, connected between the fourth comparator means and the fourth switching means, for turning off the fourth switching means in response to the control signal, fifth gating means for supplying the first gating means with the control signal when the third switching means is in an off state, and sixth gating means for supplying the second gating means with the control signal when the fourth switching means is in an off state.

The switching means of the present invention is a transistor.

In the present invention, a parasitic diode is connected in parallel with the transistor.

In the present invention, the AC power supplied to the input terminals is generated by a generator which includes an oscillating weight that turns and a generating element for generating an electromotive force in response to the turn motion of the oscillating weight.

In the present invention, the AC power supplied to the input terminals is generated by a generator which includes an elastic member to which a deforming force is exerted, rotary means that is rotated by a restoring force that takes place when the elastic member restores an original shape, and a generating element that generates an electromotive force in response to the rotary motion of the rotary means.

In the present invention, the AC power supplied to the input terminals is generated by a generator which includes a piezoelectric element that generates an electromotive force by means of the piezoelectric effect in response to a displacement applied thereto.

In the present invention, the predetermined voltage comparator means intermittently detects a voltage charged at the voltage storage element at a predetermined sampling period.

According to a third aspect of the present invention, an electronic device includes a generator for generating an AC power, a charging circuit including first comparator means for comparing a terminal voltage supplied to a first input terminal with an output voltage at a first power source line, first switching means, which is connected between the first power source line and the first input terminal, and is turned on and off under the control of the first comparator means, second comparator means for comparing a terminal voltage supplied to a second input terminal with the output voltage at the first power source line, second switching means, which is connected between the first power source line and the second input terminal, and is turned on and off under the control of the second comparator means, third comparator means for comparing the terminal voltage supplied to the first input terminal with an output voltage at a second power source line, third switching means, which is connected between the second power source line and the first input terminal, and is turned on and off under the control of the third comparator means, fourth comparator means for comparing the terminal voltage supplied to the second input terminal with the output voltage at the second power source line, fourth switching means, which is connected between the second power source line and the second input terminal, and is turned on and off under the control of the fourth comparator means, a voltage storage element, which is connected between the first power source line and the second power source line, and is charged with a charging current rectified through the first through fourth switching means, predetermined voltage comparator means, which detects a voltage charged at the voltage storage element and determines whether the detected charge voltage exceeds a predetermined voltage, and closed loop forming means which forms a closed loop path between the first input terminal and the second input terminal by turning off the third and fourth switching means and by turning on the first and second switching means, in response to the detection result by the predetermined voltage comparator means, and a processing circuit operated from the power supplied by the voltage storage element.

In the present invention, the predetermined voltage comparator means, regarding the predetermined voltage as a reference voltage, detects whether the charge voltage exceeds the reference voltage.

In the present invention, the predetermined voltage comparator means intermittently detects a voltage charged at the voltage storage element at a predetermined sampling period.

According to a fourth aspect of the present invention, a timepiece includes a generator for generating an AC power, a charging circuit comprising first comparator means for comparing a terminal voltage supplied to a first input terminal with an output voltage at a first power source line, first switching means, which is connected between the first power source line and the first input terminal, and is turned on and off under the control of the first comparator means, second comparator means for comparing a terminal voltage supplied to a second input terminal with the output voltage at the first power source line, second switching means, which is connected between the first power source line and the second input terminal, and is turned on and off under the control of the second comparator means, third comparator means for comparing the terminal voltage supplied to the first input terminal with an output voltage at a second power source line, third switching means, which is connected between the second power source line and the first input terminal, and is turned on and off under the control of the third comparator means, fourth comparator means for comparing the terminal voltage supplied to the second input terminal with the output voltage at the second power source line, fourth switching means, which is connected between the second power source line and the second input terminal, and is turned on and off under the control of the fourth comparator means, a voltage storage element, which is connected between the first power source line and the second power source line, and is charged with a charging current rectified through the first through fourth switching means, predetermined voltage comparator means, which detects a voltage charged at the voltage storage element and determines whether the detected charge voltage exceeds a predetermined voltage, and closed loop forming means which forms a closed loop path between the first input terminal and the second input terminal by turning off the third and fourth switching means and by turning on the first and second switching means, in response to the detection result by the predetermined voltage comparator means, and a time measurement circuit, operated from the power supplied from the voltage storage element, for measuring time.

The predetermined voltage comparator means of the present invention, regarding the predetermined voltage as a reference voltage, detects whether the charge voltage exceeds the reference voltage.

The predetermined voltage comparator means of the present invention intermittently detects a voltage charged at the voltage storage element at a predetermined sampling period.

BRIEF DESCRIPTION OF THE DRAWINGS

FIG. 1 is a circuit diagram of a charging circuit, illustrating an overcharge prevention method of the present invention.

FIG. 2 is a timing diagram illustrating the basic operation of the overcharge prevention method of the present invention.

FIG. 3 is a circuit diagram showing the construction of a charging circuit 100 of a first embodiment.

FIG. 4 is a circuit block diagram of one example of a control circuit 2.

FIG. 5 is a conceptual view illustrating a (wrist watch) timepiece, which incorporates the charging circuit 100.

FIG. 6 is a timing diagram illustrating the operation of the charging circuit 100 of the first embodiment.

FIG. 7 is a circuit diagram illustrating the construction of a charging circuit 101 of a second embodiment.

FIG. 8 is a timing diagram illustrating the operation of the charging circuit 100 of the first embodiment.

FIG. 9 is a circuit diagram illustrating the construction of a charging circuit 102 of a third embodiment.

FIG. 10 is a block diagram of a voltage multiplier circuit of a third embodiment.

FIG. 11 is an explanatory view of the operation of the voltage multiplier circuit of the third embodiment.

FIG. 12 shows an equivalent circuit of the voltage multiplier circuit in a voltage tripler mode.

FIG. 13 shows an equivalent circuit of the voltage multiplier circuit in a voltage doubler mode.

FIG. 14 shows an equivalent circuit of the voltage multiplier circuit in a voltage 1.5-time voltage multiplier mode.

FIG. 15 shows an equivalent circuit of the voltage multiplier circuit during direct connection (in an original voltage mode).

FIG. 16 is a circuit diagram illustrating a charging circuit 103 of a fourth embodiment.

FIG. 17 is a block diagram of a detector circuit 1A of a fifth embodiment.

FIG. 18 is a process flow diagram of the fifth embodiment.

FIG. 19 is a timing diagram of the fifth embodiment.

FIG. 20 is a block diagram of a detector circuit 1B of a sixth embodiment.

FIG. 21 is a perspective view of an electronically-controlled mechanical watch of a seventh embodiment.

FIG. 22 is an electrical block diagram of the seventh embodiment.

FIG. 23 is a circuit diagram illustrating one example of a charging circuit employing a conventional synchronous rectifier circuit.

FIG. 24 is a timing diagram illustrating the operation of the charging circuit.

BEST MODE FOR CARRYING OUT THE

[1] Principle of the Present Invention

FIG. 1 is a circuit diagram of the construction of a charging circuit illustrating an overcharge prevention method of the present invention. FIG. 2 is a timing diagram illustrating the basic operation of the overcharge prevention method of the present invention.

Referring to FIG. 1, some elements (comparators) are not shown, but the charging circuit has a construction identical to that shown in FIG. 23, and like components are designated with like reference numerals.

A charging circuit 100 includes a limiter circuit that blocks a charging current i to a high-capacitance capacitor C using a predetermined method to prevent overcharge to the high-capacitance capacitor C.

Specifically, when the voltage charged at the high-capacitance capacitor C reaches a predetermined threshold value, the limiter circuit forms a closed loop path (see FIG. 1), different from a standard charging path, by turning on P-channel FETs MP1 and MP2, and prevents the high-capacitance capacitor C from being overcharged, by allowing an AC current from a generator AG to flow through the closed loop path (as indicated by the arrows).

When the limiter circuit turns on P-channel FETs MP1 and MP2 with N-channel FET MN1 or MN2 in an on state (hatched portion) in the construction shown in FIG. 1, as shown in FIG. 2, the high-capacitance capacitor C is shortcircuited, causing a reverse current (short-circuit current) from the high-capacitance capacitor C, and power stored in the high-capacitance capacitor C is needlessly consumed. As a result, the high-capacitance capacitor C itself and a circuit section 7 are damaged.

In accordance with the present invention, the overcharging of the high-capacitance capacitor C is prevented by controlling the ON or OFF state of either P-channel FET MP1 or MP2. Additionally, the generation of the short-circuit current by the high-capacitance capacitor C is prevented by controlling the ON or OFF state of the N-channel FETs MN1 and MN2, as well.

[2] First Embodiment

A first preferred embodiment of the present invention is now discussed in detail.

[2.1] Construction of the First Embodiment

FIG. 3 is a circuit diagram showing the construction of the charging circuit 100 of the first embodiment. Components identical to those described with reference to FIG. 23 are designated with the same reference numerals and the discussion about them is omitted here.

Referring to FIG. 3, a detector circuit 1 detects a charge voltage Va in the high-capacitance capacitor C and compares the charge voltage Va with an unshown predetermined reference voltage. When the charge voltage Va becomes equal to or higher than the reference voltage, the detector circuit 1 feeds a limiter signal SLIM to a control circuit 2 to prevent overcharge. In response to the limiter signal SLIM, the control circuit 2 outputs a control signal CS1 having a rising edge delayed from the rising edge of the limiter signal SLIM and a control signal CS2 having a falling edge delayed from the falling edge of the limiter signal SLIM.

An AND gate 3 is connected between a comparator COM P1A and P-channel FET MP1, and the control signal CS1 applied to an inverting input terminal of the AND gate 3 negates the output of the comparator COM P1A applied to the other input terminal of the AND gate 3. The AND gate 3 feeds an "L" level signal to the gate of the P-channel FET MP1, for the duration throughout which the control signal CS1 remains at an "H" level.

An AND gate 4 is connected between a comparator COM P1B and P-channel FET MP2, and the control signal CS1 applied to an inverting input terminal of the AND gate 4 negates the output of the comparator COM P1B applied to the other input terminal of the AND gate 4. The AND gate 4 feeds an "L" level signal to the gate of the P-channel FET MP2, for the duration throughout which the control signal CS1 remains at an "H" level.

An AND gate 5 is connected between a comparator COM P2A and N-channel FET MN1, and the control signal CS2 applied to an inverting input terminal of the AND gate 5 negates the output of the comparator COM P2A applied to the other input terminal of the AND gate 5. The AND gate 5 feeds an "L" level signal to the gate of the N-channel FET MN1, at least for the duration throughout which the control signal CS2 remains at an "H" level.

An AND gate 6 is connected between a comparator COM P2B and N-channel FET MN2, and the control signal CS2 applied to an inverting input terminal of the AND gate 6 negates the output of the comparator COM P2B applied to the other input terminal of the AND gate 6. The AND gate 6 feeds an "L" level signal to the gate of the N-channel FET MN2, at least for the duration throughout which the control signal CS2 remains at an "H" level.

The control signal CS1 having a rising edge delayed from that of the limiter signal SLIM is fed to the inverting input terminals of the AND gate 3 and the AND gate 4, while the control signal CS2 having a falling edge delayed from that of the limiter signal SLIM is fed to the inverting input terminals of the AND gate 5 and the AND gate 6. In accordance with this configurarion the off time of the N-channel FETs MN1 and MN2 is set to be longer than on time of the P-channel FETs MP1 and MP2.

Specifically, when the limiter signal SLIM is transitioned to an "H" level, P-channel FETs MP1 and MP2 are turned on after N-channel FETs MN1 and MN2 are turned off. When the limiter signal SLIM is transitioned to an "L" level, the P-channel FETs MP1 and MP2 revert back to their original states and then the N-channel FETs MN1 and MN2 revert back to their original states.

The high-capacitance capacitor C is charged with power generated by the generator AG and full-wave rectified through a synchronous rectifier circuit, and feeds drive power to the circuit section 7. The high-capacitance capacitor C has a withstand voltage and has the characteristic that a charging in excess of the withstand voltage places the capacitor C into an overcharged state, degrading the capacitor C and lowering its charging efficiency. In this embodiment, the high-capacitance capacitor C is employed. The present invention is not limited to this, and alternatively, a secondary battery may be employed.

FIG. 4 is a circuit block diagram showing one example of the above-described control circuit 2. Referring to FIG. 4, a delay circuit 2a, employing a capacitor or the like, delays the limiter signal SLIM, namely, the output of the detector circuit 1, by a predetermined time, and supplies one input terminal of an AND gate 2b and one input terminal of an OR gate 2c with the delayed limiter signal SLIM, referred to as a limiter signal SLIM'. Receiving the limiter signal SLIM at the other input terminal, the AND gate 2b ANDs the limiter signal SLIM and the delayed limiter signal SLIM', and outputs the resulting signal as the control signal SC1.

In other words, the AND gate 2b becomes a signal having a rising edge which is delayed by a predetermined time from the rising edge of the limiter signal SLIM. The falling edge of the control signal CS1 coincides with the falling edge of the limiter signal SLIM.

The OR gate 2c receives, at the other input terminal, the limiter signal SLIM, and ORs the limiter signal SLIM and the delayed limiter signal SLIM', and outputs the resulting signal as the control signal CS2.

In other words, the OR gate 2c becomes a signal having a falling edge delayed by a predetermined time from the limiter SLIM. The rising edge of the control signal CS2 coincides with the rising edge of the limiter signal SLIM.

Now discussed is one example in which the charging circuit of this embodiment is incorporated. FIG. 5 is a conceptual view roughly showing a (wrist watch) timepiece in which the charging circuit is incorporated. As shown, the generator AG includes a rotor 14 and a stator 15, and when the disklike rotor 14 having two magnetized poles rotates, an electromotive force occurs in an output coil 16 of the stator 15, and an AC current is thus picked up.

As shown in FIG. 5, an oscillating weight 13 turns in a wristwatch case, and a train wheel mechanism 11 transfers a turn motion of the oscillating weight 13 to the generator AG. The oscillating weight 13 turns as a person wearing the wristwatch swings his or her arm, and the generator AG provides power in response to the motion of the wristwatch.

The AC power provided by the generator AG is full-wave rectified by the charging circuit 100 and charges the high-capacitance capacitor C. A processing section 9 drives a clocking unit 8 with power supplied from the high-capacitance capacitor C. The clocking unit 8, composed of a crystal oscillator, counter circuits, etc., frequency-divides a master clock signal, generated by the crystal oscillator, through the counter circuit, performs time measurement based on the frequency division result, and drives a stepping motor to turn hands.

[2.2] Operation of the First Embodiment

The operation of the charging circuit 100 of the first embodiment is now discussed, referring to drawings.

FIG. 6 is a timing diagram illustrating the operation of the charging circuit 100 of the first embodiment. The ordinary charging operation remains unchanged from the one discussed referring to the timing diagram shown in FIG. 23, and the discussion about it is omitted here.

In a charging process in which the high-capacitance capacitor C is charged with the charging current i, the limiter signal SLIM is fed to the control circuit 2 to prevent overcharge when the detector circuit 1 detects that a charge voltage Va at the high-capacitance capacitor C becomes equal to or higher than a reference voltage (a) of FIG. 6. The control circuit 2 feeds the limiter signal SLIM to the delay circuit 2a while also feeding the limiter signal SLIM to the other input terminal of the AND gate 2b and the other input terminal of the OR gate 2c.

The delay circuit 2a delays the limiter signal SLIM by a predetermined time, and feeds it as the limiter signal SLIM' to the one input terminal of the AND gate 2b and the one input terminal of the OR gate 2c.

The control circuit 2 outputs the control signal CS1 that is transitioned to an "H" level with a delay time subsequent to the limiter signal SLIM, while outputting the control signal CS2 that is transitioned to an "H" level concurrently with the limiter signal SLIM (a), (b) and (c) of FIG. 6.

The P-channel FETs MP1 and MP2 remain on, at least for a duration throughout which the control signal CS1 is at an "H" level (e) and (g) of FIG. 6. As a result, a closed loop path, different from the standard charging path, is formed as shown in FIG. 3.

The N-channel FETs MN1 and MN2 remains off, at least for the duration throughout which the control signal CS2 is at an "H" level (i) and (k) of FIG. 6. The AC current from the generator AG flows through the arrow-headed closed loop path, the charging current i to the high-capacitance capacitor C is cut off, and overcharging of the high-capacitance capacitor C is thus prevented (l) of FIG. 6.

If the period T1 throughout which the control signal CS1 remains at an "H" level is compared with the period T2 throughout which the control signal CS2 remains at an "H" level, the period T2 throughout which the control signal CS2 remains at an "H" level is longer by the delay caused by the control circuit 2.

Specifically, in the limiter operation, the P-channel FETs MP1 and MP2 are turned on after the N-channel FETs MN1 and MN2 are turned off.

When the limiter signal SLIM is transitioned to an "L" level in a limiter release operation, the N-channel FETs MN1 and MN2 are restored to their normal operational state after the P-channel FETs MP1 and MP2 are restored to their normal operational state.

While the P-channel FETs MP1 and MP2 remain on, the N-channel FETs MN1 and MN2 are necessarily off.

As a result, the high-capacitance capacitor C is not shorted, no short-circuit current is caused, the power stored in the high-capacitance capacitor C is not needlessly consumed, and the high-capacitance capacitor C and the circuit section 7 remain free from damage.

When the short-circuit current (limiter current ILIM) flows through the generator AG via the closed loop path composed of the P-channel FETs MP1 and MP2, electromagnetic noise possibly occurs in the coil 16 and the rotor 14, thereby causing the circuit section 5 to erratically operate. On the other hand, the charging circuit performs automatic control in which the short-circuit current (limiter current ILIM) applies electromagnetic braking to the rotation of the rotor 14, causing terminal voltages V1 and V2 to drop, and reducing the short-circuit current (limiter current ILIM). As a result, the generation of electromagnetic noise in the rotor 14 is controlled.

As a method for preventing the overcharge, opening the charging path to the high-capacitance capacitor C is also contemplated.

In such an arrangement, however, a back electromotive force, which is generated in the generator AG at the moment the charging path is opened, is applied to circuit elements (P-channel FETs MP1 and MP2, N-channel FETs MN1 and MN2, comparators CMP1A, CMP1B, CMP2A, and CMP2B), and withstand voltages of these circuit elements must be increased.

Since a charging circuit in a compact portable device, such as a wristwatch, is constructed of integrated circuits using miniature circuit elements to promote miniaturization, increasing the withstand voltages is difficult.

In view of this problem, this embodiment forms the closed loop path through the input terminals AG1 and AG2 at the moment the charge voltage Va exceeds the predetermined voltage, and hence circuit elements with low withstand voltages work. The use of integrated circuits is facilitated, promoting miniaturization of the charging circuit.

[2.3] Advantages of the First Embodiment

In accordance with the first embodiment, as discussed above, the closed loop path, different from the charging path, is formed by turning off the N-channel FETs MN1 and MN2 and then by turning on the P-channel FETs MP1 and MP2, when the charge voltage Va at the high-capacitance capacitor C exceeds the reference voltage. The charge voltage Va does not exceeds the withstand voltage of the high-capacitance capacitor C, and thereby the high-capacitance capacitor C is protected against overcharging.

Furthermore, since the high-capacitance capacitor C is not shorted, the power stored in the high-capacitance capacitor C is not needlessly consumed, and the high-capacitance capacitor C and the circuit section 5 are protected against damage.

In accordance with the first embodiment, the closed loop path, different from the charging path, is formed, permitting the generated current to flow therethrough.

Since the high-capacitance capacitor C is protected against overcharging, circuit elements with low withstand voltages works, and the use of integrated circuits is easily promoted.

When the closed loop path is formed through the input terminals AG1 and AG2, short-circuit braking is applied to the rotation of the rotor 14, the amplitudes of the terminal voltages V1 and V2 are automatically reduced, and the generation of electromagnetic noise in the coil 16 and the rotor 14 is controlled.

[3] Second Embodiment

In the first embodiment, to form the closed loop path different from the charging path, the N-channel FETs MN1 and MN2 are forced to be off before the P-channel MP1 and MP2 are turned on.

In a second embodiment, a closed loop path is formed by turning on the P-channel FETs MP1 and MP2 with the N-channel FETs MN1 and MN2 remaining off.

[3.1] Construction of the Second Embodiment

FIG. 7 is a circuit diagram showing the construction of a charging circuit 101 of the second embodiment. Components identical to those described with reference to FIG. 3 are designated with the same reference numerals, and the discussion about them is omitted here.

Referring to FIG. 7, the charging circuit 101 is identical to the charging circuit 100 of the first embodiment but with the control circuit 2 removed therefrom and AND gates 20 and 21 newly added thereto.

Although the function of the detector circuit 1 remains unchanged from that of the detector circuit 1 in the first embodiment, the limiter signal SLIM output by the detector circuit 1 is input to one input terminal of the AND gate 20, inverting input terminals of AND gates 5 and 6 and one input terminal of the AND gate 21.

The output signal of the AND gate 5, namely, a signal applied to the gate of N-channel FET MN1, is fed to an inverting input terminal of the AND gate 20.

The AND gate 20 feeds the limiter signal SLIM (at an "H" level) from the detector circuit 1 to an inverting input terminal of an AND gate 3 when the signal fed to the gate of the N-channel FET MN1 is at an "L" level, in other words, the N-channel FET MN1 is turned off.

The P-channel FET MP1 is turned on in response to the limiter signal SLIM, only when the N-channel FET MN1 is turned off.

The output signal of the AND gate 6, namely, the signal applied to the gate of the N-channel MN2, is fed to the inverting input terminal of the AND gate 21.

The AND gate 21 feeds the limiter signal (at an "H" level) from the detector circuit 1 to the inverting input terminal of the AND gate 4 when the signal applied to the gate of the N-channel FET MN2 is at an "L" level, in other words, when the N-channel FET MN2 is off.

The P-channel FET MP2 is turned on in response to the limiter signal SLIM, only when the N-channel FET MN2 is turned off.

[3.2] Operation of the Second Embodiment

The operation of the charging circuit 101 of the second embodiment is now discussed, referring to drawings. FIG. 8 is a timing diagram showing the operation of the charging circuit 101 of the second embodiment. The ordinary charging operation remains unchanged from the one discussed referring to the timing diagram shown in FIG. 23, and the discussion about it is omitted here.

In a charging process in which the high-capacitance capacitor C is charged with the charging current i, the detector circuit 1 supplies the limiter signal SLIM for preventing overcharge to the one input terminal of the AND gate 20, the inverting input terminals of the AND gates 5 and 6, and the one input terminal of the AND gate 21(a) of FIG. 8, when the detector circuit 1 detects that the charge voltage Va of the high-capacitance capacitor becomes equal to or higher than the reference voltage.

When the N-channel FET MN1 is turned off (h) of FIG. 8, the limiter signal SLIM (at an "H" level), applied to the AND gate 20, is fed to the inverting input terminal of the AND gate 3, turning on the gate of the P-channel FET MP1 (to an "L" level) (c) of FIG. 8 and putting the P-channel FET MP1 into an on state. When the N-channel FET MN2 is turned off (j) of FIG. 8, the limiter signal SLIM (at an "H" level), fed to the AND gate 21, is fed to the inverting input terminal of the AND gate 4.

The gate of the P-channel FET MN2 is turned on (to an "L" level) (e) of FIG. 8, and the P-channel FET MN2 is turned on. In this way, the P-channel FETs MP1 and MP2 are put into the on state, at least for the duration throughout which the N-channel FETs MN1 and MN2 are turned off.

The closed loop path, different from the normal charging path, is formed, the AC current (limiter current ILIM) of the generator AG flows as represented by the arrow-headed closed loop paths, the charging current to the high-capacitance capacitor C is cut off, and the high-capacitance capacitor C is protected against overcharging. Throughout this period, the N-channel FETs MN1 and MN2 are necessarily off, no short-circuit current by the high-capacitance capacitor C is caused, and the high-capacitance capacitor C and the circuit section 7 remain free from damage.

[4] Third Embodiment

A third preferred embodiment of the present invention is discussed in detail.

[4.1] Construction of the Third Embodiment

FIG. 9 is a circuit diagram showing the construction of a charging circuit 102 of a third embodiment. As shown in FIG. 9, components identical to those described with reference to FIG. 3 are designated with the same reference numerals, and the discussion about them is omitted here.

The difference between the charging circuit 102 of the third embodiment and the charging circuit 100 of the first embodiment shown in FIG. 3 lies in that the charging circuit 102 includes a voltage multiplier circuit 49 for producing increased drive voltage $V_{SS}$ by multiplying an output voltage $V_{SS'}$ of the high-capacitance capacitor C and auxiliary capacitor CS charged with the increased voltage $V_{SS}$ so that the increased drive voltage $V_{SS}$ is fed to a rectification control circuit composed of the circuit section 7, detector circuit 1, control circuit 2, comparators CMP1A, CMP1B, CMP2A, and CMP2B, and AND gates 3, 4, 5, and 6.

Referring to FIG. 10, the voltage multiplier circuit 49 includes a switch SW1, one terminal of which is connected to a high-voltage terminal of the high-capacitance capacitor C; a switch SW2, one terminal of which is connected to the other terminal of the switch SW1, and the other terminal of which is connected to a low-voltage terminal of the high-capacitance capacitor C, a capacitor 49a, one terminal of which is connected to the junction of the switch SW1 and switch SW2; a switch SW3, one terminal of which is connected to the other terminal of the capacitor 49a, and the other terminal of which is connected to the low-voltage terminal of the high-capacitance capacitor C, a switch SW4, one terminal of which is connected to a low-voltage terminal of an auxiliary capacitor CS, and the other terminal of which is connected to the junction of the capacitor 49a and the switch SW3; a switch SW11, one terminal of which is connected to the junction of the high-voltage terminal of the high-capacitance capacitor C and a high-voltage terminal of the auxiliary capacitor CS, a switch SW12, one terminal of which is connected to the other terminal of the switch SWI1, and the other terminal of which is connected to the low-voltage terminal of the high-capacitance capacitor C, a capacitor 49b, one terminal of which is connected to the junction of the switch S11 and the switch SW12, a switch SW13, one terminal of which is connected to the other terminal of the capacitor 49b, and the other terminal of which is connected to the junction of the switch SW12 and the low-voltage terminal of the high-capacitance capacitor C, a switch SW14, one terminal of which is connected to the junction of the capacitor 49b and the switch SW13, and the other terminal of which is connected to the low-voltage terminal of the auxiliary capacitor CS, and a switch SW21, one terminal of which is connected to the junction of the switch SW11 and the switch SW12, and the other terminal of which is connected to the junction of the capacitor 49a and the switch SW3.

[4.2] Operation of the Third Embodiment

[4.2.1] Operation of the Voltage Multiplier Circuit

The operation of the third embodiment remains unchanged from that of the first embodiment, except for the operational voltages ($V_{SS'}$ and $V_{SS}$), and the following discussion focuses on the operation of the voltage multiplier circuit and its associated circuits.

Referring to FIG. 10 through FIG. 15, the operation of the voltage multiplier circuit 49 is discussed in connection with a voltage tripler mode, a voltage doubler mode, a one-andhalf-time voltage multiplier mode, an original voltage mode (short mode) and an original voltage mode (charge transfer mode).

[4.2.1.1] Voltage Tripler Mode

The voltage multiplier circuit 49 operates in response to a voltage multiplication clock CKUD input from outside, and, at a first voltage multiplication timing (parallel connection timing), turns switch SWI on, switch SW2 off, switch SW3 on, switch SW4 off, switch SW11 on, switch SW12 off, switch SW13 on, switch SW14 off, and switch SW21 off as shown in FIG. 11 during a voltage tripler mode.

The equivalent circuit of the voltage multiplier circuit 49 in this case is shown in (a) of FIG. 12, and the capacitor 49a and the capacitor 49b are supplied with power from the high-capacitance capacitor C and are continuously charged until the voltage of each of the capacitor 49a and the capacitor 49b becomes substantially equal to that of the high-capacitance capacitor C.

In response to a second voltage multiplication timing (serial connection timing), the voltage multiplier circuit 49 turns switch SW1 off, switch SW2 on, switch SW3 off, switch SW4 off, switch SW11 off, switch SW12 off, switch SW13 off, switch SW14 on, and switch SW21 on.

The equivalent circuit of the voltage multiplier circuit 49 in this case is shown in (b) of FIG. 12, the high-capacitance capacitor C, capacitor 49a and capacitor 49b are connected in series, the auxiliary capacitor CS is charged with the voltage three times as large as the voltage of the high-capacitance capacitor C, and hence the triple voltage is thus obtained.

[4.2.1.2] Voltage Doubler Mode

The voltage multiplier circuit 49 operates in response to a voltage multiplication clock CKUD input from outside, and, at a first voltage multiplication timing (parallel connection timing), turns switch SW1 on, switch SW2 off, switch SW3 on, switch SW4 off, switch SW11 on, switch SW12 off, switch SW13 on, switch SW14 off, and switch SW21 off as shown in FIG. 11 during a voltage doubler mode.

The equivalent circuit of the voltage multiplier circuit 49 in this case is shown in (a) of FIG. 13, and the capacitor 49a and the capacitor 49b are supplied with power from the high-capacitance capacitor C and are continuously charged until the voltage of each of the capacitor 49a and the capacitor 49b becomes substantially equal to that of the high-capacitance capacitor C.

In response to a second voltage multiplication timing (serial connection timing), the voltage multiplier circuit 49 turns switch SW1 off, switch SW2 on, switch SW3 off, switch SW4 on, switch SW11 off, switch SW12 on, switch SW13 off, switch SW14 on, and switch SW21 off.

The equivalent circuit of the voltage multiplier circuit 49 in this case is shown in (b) of FIG. 13, the high-capacitance capacitor C is connected in series with each of the capacitor 49a and capacitor 49b, the auxiliary capacitor CS is charged with the voltage twice as large as the voltage of the high-capacitance capacitor C, and hence the double voltage is thus obtained.

[4.2.1.3] One-and-half-time Voltage Multiplier Mode

The voltage multiplier circuit 49 operates in response to a voltage multiplication clock CKUD input from outside, and, at a first voltage multiplication timing (parallel connection timing), turns switch SW1 on, switch SW2 off, switch SW3 off, switch SW4 off, switch SW11 off, switch SW12 off, switch SW13 on, switch SW14 off, and switch SW21 on as shown in FIG. 11 during a one-and-half-time voltage multiplier mode.

The equivalent circuit of the voltage multiplier circuit 49 in this case is shown in (a) of FIG. 14, and the capacitor 49a and the capacitor 49b are supplied with power from the high-capacitance capacitor C and are continuously charged until the voltage of each of the capacitor 49a and the capacitor 49b becomes substantially equal to half the voltage of the high-capacitance capacitor C.

In response to a second voltage multiplication timing (serial connection timing), the voltage multiplier circuit 49 turns switch SW1 off, switch SW2 on, switch SW3 off, switch SW4 on, switch SW11 off, switch SW12 on, switch SW13 off, switch SW14 on, and switch SW21 off.

The equivalent circuit of the voltage multiplier circuit 49 in this case is shown in (b) of FIG. 14, the high-capacitance capacitor C is connected in series with both the capacitor 49a and capacitor 49b connected in parallel, the auxiliary capacitor CS is charged with the voltage one and half times as large as the voltage of the high-capacitance capacitor C, and hence the one-and-half-time voltage is thus obtained.

[4.2.1.4] Original Voltage Mode (no voltage multiplication; short mode)

The voltage multiplier circuit 49 turns switch SW1 off, switch SW2 on, switch SW3 on, switch SW4 on, switch SW11 off, switch SW12 on, switch SW13 on, switch SW14 on, and switch SW21 off as shown in FIG. 11 during an original voltage mode.

The connection of the voltage multiplier circuit 49 is shown in (a) of FIG. 15, and its equivalent circuit is shown in (b) of FIG. 15, wherein the high-capacitance capacitor C is directly connected with the auxiliary capacitor CS.

[4.2.2] Advantages of the Third Embodiment

In accordance with the third embodiment, as discussed above, the increased drive voltage $V_{SS}$ is supplied to the rectification control circuit composed of the circuit section 7, detector circuit 1, control circuit 2, comparators CMP1A, CMP1B, CMP2A, and CMP2B, and AND gates 3, 4, 5, and 6, and even if the voltage $V_{SS'}$ of the high-capacitance capacitor C (corresponding the voltage at the high-voltage terminal in this embodiment) is low, the increased voltage $V_{SS}$ is reliably supplied, and the circuit section 7 is thus stably driven.

With the power source voltage $V_{SS'}$ not multiplied, control voltages supplied to rectifying transistors P-channel FETs MP1 and MP2 and N-channel FETs MN1 and MN2 become low when the voltage $V_{SS'}$ in the high-capacitance capacitor C becomes low, and the charging efficiency drops. According to the third embodiment, the increased power source voltage $V_{SS}$, multiplied from the power source voltage $V_{SS'}$, drives the P-channel FETs MP1 and MP2 and N-channel FETs MN1 and MN2, and hence the on-state resistance of each transistor is decreased.

Specifically, drain current Ids is expressed in the following equation, and increases in proportion to the square of gate voltage Vgs. By increasing the control voltage applied to the gate, the drive capability of the transistor is increased, and the on-state resistance is decreased, and hence the rectification efficiency is improved.

$$Ids=(W/L)\cdot\beta\cdot(Vgs-Vth)^2/2$$

where L is a channel length, W is a channel width, β is a gain constant.

[5] Fourth Embodiment

A fourth preferred embodiment of the present invention is now discussed.

[5.1] Construction of the Fourth Embodiment

FIG. 16 is a circuit diagram of a charging circuit 103 of a fourth embodiment. In FIG. 16, components identical to those described in connection with FIG. 3 for the first embodiment are designated with the same reference numerals, and the discussion about them is omitted here.

The difference between the charging circuit 103 of the fourth embodiment and the charging circuit 100 of the first embodiment is that a voltage multiplier circuit 49A is inserted between an AND gate 3 and P-channel FET MP1, and that a voltage multiplier circuit 49A is inserted between an AND gate 4 and P-channel FET MP2.

The voltage multiplier circuit 49A is different from the voltage multiplier circuit 49 in that the voltage multiplier circuit 49 has a variable voltage multiplication rate so that the increased power source voltage $V_{SS}$ falls within a predetermined voltage range while the fourth embodiment fixes the voltage multiplication rate (of 2, for example).

Out of the constructions of the voltage multiplier circuit 49, the voltage multiplier circuit 49A takes the equivalent circuit having a voltage multiplication rate of 2 as shown in FIG. 24.

[5.2] Operation of the Fourth Embodiment

In accordance with the fourth embodiment, in a charging process in which the high-capacitance capacitor C is charged with the charging current i, the detector circuit 1 supplies the limiter signal SLIM for preventing overcharge to the control circuit 2, when the absolute value of charge voltage Va of the high-capacitance capacitor C becomes equal to or higher than the reference voltage.

The control circuit 2 feeds the limiter signal SLIM to the delay circuit 2a (see FIG. 4), the other input terminal of the AND gate 2b and the other input terminal of the OR gate 2c.

The delay circuit 2a delays the limiter signal by a predetermined time, and feeds the delayed signal, as a limiter signal SLIM', to one input terminal of the AND gate 2b and one input terminal of the OR gate 2c.

The control circuit 2 outputs, to the voltage multiplier circuits 49A, the control signal CS1 that is transitioned to an "H" level with a predetermined time delay from the limiter signal SLIM and outputs, to the N-channel FETs MN1 and MN2, the control signal CS2 which is transitioned to an "H" level at the same timing as the limiter signal SLIM.

The voltage multiplier circuit 49A multiplies the control signal CS1 at a fixed voltage multiplication rate (of 2 for example), and feeds the voltage-multiplied signal CS1 to the P-channel FETs MP1 and MP2.

As a result, the P-channel FETs MP1 and MP2 remain in an on state, at least for a duration throughout which the control signal CS1 is at an "H" level. The closed loop path, different from the ordinary charging path, is thus formed, as shown in FIG. 3.

On the other hand, the N-channel FETs MN1 and MN2, remain in an off state, at least for a duration throughout which the control signal CS2 is at an "H" level.

The AC current of the generator AG flows along the arrow-headed closed loop paths, the charging current i to the high-capacitance capacitor C is cut off, and the overcharging of the high-capacitance capacitor C is thus precluded.

Unlike the voltage multiplier circuit 49 in the third embodiment, the voltage multiplier circuits 49A multiply voltage at a fixed voltage multiplication rate to drive rectifying transistors, namely, P-channel FETs MP1 and MP2, regardless of the voltage supplied to the circuit section 7.

The fourth embodiment thus provides a higher rectification efficiency than the third embodiment.

If the period T1 throughout which the control signal CS1 remains at an "H" level is compared with the period T2 throughout which the control signal CS2 remains at an "H" level, the period T2 throughout which the control signal CS2 remains at an "H" level is longer by the delay caused by the control circuit 2.

Specifically, in the limiter operation, the P-channel FETs MP1 and MP2 are turned on after the N-channel FETs MN1 and MN2 are turned off.

When the limiter signal SLIM is transitioned to an "L" level in a limiter release operation, the N-channel FETs MN1 and MN2 are restored to their normal operational state after the P-channel FETs MP1 and MP2 are restored to their normal operational state.

While the P-channel FETs MP1 and MP2 remain on, the N-channel FETs MN1 and MN2 are necessarily off.

As a result, the high-capacitance capacitor C is not shorted, no short-circuit current is caused, the power stored in the high-capacitance capacitor C is not consumed in vain, and the high-capacitance capacitor C and the circuit section 7 remain free from damage.

[5.3] Advantages of the Fourth Embodiment

The fourth embodiment further offers improved rectification efficiency, besides the advantages of the third embodiment.

[6] Fifth Embodiment

In a fifth embodiment, the detector circuit 1 in the first through fourth embodiments is replaced with a detector circuit 1A for performing sampling detection operation.

[6.1] Construction of the Fifth Embodiment

FIG. 17 shows the construction of the detector circuit 1A of the fifth embodiment.

The detector circuit 1A includes a voltage divider 50, which voltage divides the voltage Va of the high-capacitance capacitor C to obtain detected voltage Va' proportional to the voltage Va, a reference voltage generator circuit 51 for generating a reference voltage Vref, a comparator 52 for outputting an original limiter signal SLIM0 by comparing the detected voltage Va' with the reference voltage Vref, a latch circuit 53 for latching and holding the original limiter signal SLIM0 at a timing corresponding to a sampling signal SS3 to output a limiter signal SLIM1, a switch SW51 for feeding power to the reference voltage generator circuit 51 in accordance with a sampling signal SS1, a switch SW52 for feeding power to the comparator 52 in accordance with a sampling signal SS2, and a switch SW53 for connecting the voltage divider 50 to the high-capacitance capacitor C in accordance with the sampling signal SS3.

The order of timings for the sampling signal SS1, sampling signal SS2, and sampling signal SS3 to be transitioned from an "L" level to an "H" level, namely, for the switch SW51, switch SW52, and switch SW53 to be turned on, are as follows:

sampling signal SS1→sampling signal SS2→sampling signal SS3.

The reference voltage generator circuit 51, which takes time most before reaching its stable operation, is supplied with power, and the comparator 52 is then supplied with power. When the reference voltage Vref and the operation of the comparator 52 are stabilized, the voltage divider 50 is connected to the high-capacitance capacitor C, and the latch circuit 53 receives the original limiter signal SLIM0.

[6.2] Operation of the Fifth Embodiment

The operation of a major portion of the fifth embodiment is now discussed, referring to a process flow diagram shown in FIG. 18 and a timing diagram shown in FIG. 19. In practice, transition timings are successively shifted in the order of sampling signal SS1→sampling signal SS2→sampling signal SS3, although the transition timings of the sampling signals SS1, SS2 and SS3 are shown as being at the same timing, for simplicity, as shown in FIG. 19.

A determination is made of whether an elapsed time T from a preceding sampling timing becomes equal to or longer than a sampling period Tsp (step S1).

When it is determined in step S1 that the elapsed time T from the preceding sampling timing is shorter than the sampling period Tsp (No in step S1), the process goes to standby state, in which step S1 is repeated.

When it is determined in step S1 that the elapsed time T from the preceding sampling timing is equal to or longer than the sampling period Tsp (Yes in step S1), the sampling signal SS1, sampling signal SS2 and sampling successively transitioned from an "L" level to an "H" level at each of t1, t3 and t4 as shown in FIG. 19. Specifically, the switch SW51, switch SW52, and switch SW53 are successively turned on. The reference voltage generator circuit 51 is powered, the comparator 52 is then powered, and when the reference voltage Vref and the operation of the comparator 52 become stabilized, the voltage divider 50 is connected to the high-capacitance capacitor C, and the comparator 52 determines whether the detected voltage Va' exceeds the reference voltage Vref (step S2).

When it is determined in step S2 that the detected voltage Va' is above the reference voltage Vref with the original limiter signal SLIM0 at an "H" level for a duration from t2 to t5 as shown in FIG. 19 (Yes in step S2), the latch circuit 53 picks up the original limiter signal SLIM0 at an "H" level at t3 and t4 in FIG. 19, and the limiter signal SLIM1 is transitioned to an "H" level (step S3).

The control circuit 2 outputs the control signal CS2 to turn off the N-channel FETs MN1 and MN2 (step S4), and determines whether the N-channel FETs MN1 and MN2 have been turned off (step S5).

When it is determined in step S5 that at least one of the N-channel FETs MN1 and MN2 is turned on (No in step S5), the process returns to step S4, where the control signal CS1 is output to turn off the N-channel FETs MN1 and MN2.

When it is determined in step S5 that both FETs MN1 and MN2 are turned on (Yes in step S5), the P-channel FETs MP1 and MP2 are turned on (step S6), and the process returns to step S1 to repeat the above steps.

When it is determined in step S2 that the detected voltage Va' is below the reference voltage Vref with the original limiter signal SLIM0 at an "L" level for a duration from t1 to t2 or from t5 thereafter as shown in FIG. 19 (No in step S2), the latch circuit 53 picks up the original limiter signal SLIM0 at an "L" level at t1 and t6 in FIG. 20, and the limiter signal SLIM1 is transitioned to an "L" level (step S7), and the process returns to step S1 to repeat the above steps.

[6.3] Advantages of the Fifth Embodiment

In accordance with the fifth embodiment, as discussed above, the operation of the detector circuit 1A is intermittently performed in accordance with the sampling signals, the power consumption involved in detection is reduced.

[7] Sixth Embodiment

[7.1] Construction of the Sixth Embodiment

FIG. 20 shows the construction of a detector circuit of a sixth embodiment of the present invention.

The detector circuit 1B includes a constant current source $C_{CNST}$, one end of which is connected to a power source $V_{DD}$, a transistor Q1, the drain D and the gate G of which are connected together to the other end of the constant current source $C_{CNST}$, a transistor Q2, the drain D and the gate G of which are connected together to the source S of the transistor Q1, a pull-up resistor $R_{PU}$, one end of which is connected to the power source $V_{DD}$, an inverter INV1, the input terminal of which is connected to the other end of the pull-up resistor $R_{PU}$, for outputting a limiter signal SLIM, and a current mirror circuit CMC connected to the source S of the transistor Q2, the other end of the pull-up resistor $R_{PU}$ and a power source $V_{SS}$.

The current mirror circuit CMC includes a transistor $Q_D$, the drain D and the gate G of which are connected together to the source S of the transistor Q2, and the source S of which is connected to the power source $V_{SS}$, and a transistor $Q_C$, the drain D of which is connected to the other end of the pull-up resistor $R_{PU}$, the gate G of which is connected to the gate G of the transistor $Q_D$, and the source S of which is connected to the power source $V_{SS}$.

[7.2] Operation of the Sixth Embodiment

The operation of the detector circuit 1B of the sixth embodiment is now discussed.

When a power source voltage $(V_{SS'}-V_{DD})$ is in a low range, in other words, lower than the sum of threshold voltages of the transistor Q1, transistor Q2, and transistor $Q_D$, no current flows from the constant current source $C_{CNST}$, and the transistor $Q_D$ and the transistor $Q_C$ in the current mirror circuit CMC remain off. A voltage V1 (corresponds to an "H" level), pulled up to the power source $V_{DD}$ through the pull-up resistor $R_{PU}$, is fed to the input terminal of the first inverter INV1, and the first inverter INVI outputs the limiter signal SLIM at an "L" level, keeping a limiter transistor 40 in an off state.

When the power source voltage $(V_{SS'}-V_{DD})$ becomes large and exceeds the predetermined voltage (the sum of threshold voltages of the transistor Q1, transistor Q2, and transistor $Q_D$ in FIG. 20), a current flows from the constant current source $C_{CNST}$ to the power source $V_{SS'}$ through the transistors Q1, Q2, and $Q_D$, and a current, having the same magnitude as that flowing through the drain D and the source S of the transistor $Q_D$, flows through the drain D and the source S of the transistor $Q_C$.

The current flowing through the transistor $Q_C$ is set to be larger than the current flowing through the pull-up resistor $R_{PU}$, and as a result, the voltage V1 corresponds to an "L" level.

In this way, the first inverter INV1 outputs an "H" level signal, turning the limiter transistor 40 on and thereby permitting the limiter current to flow.

The voltage detector circuit 1B in the sixth embodiment consumes almost no current when the power source voltage is low, and properly serves as a circuit for preventing excessive voltage in a portable electronic device operated from a battery.

[8] Modifications

The present invention is not limited to the above embodiments, and, for example, the following various modifications are possible.

[8.1] First Modification

In each of the above embodiments, the electronic device employing charging circuit 100 or 101 is a wristwatch, but the present invention is not limited to this. The present invention may be implemented in a pocket timepiece, a table clock, a calculator, a portable personal computer, an electronic pocketbook, a portable radio, a portable tonometer, a portable telephone, a pager, a pedometer, etc. The present invention may be implemented in any electronic device that consumes power. In such an electronic device, internal electronic circuits and mechanisms are continuously used even with no battery employed. The electronic device may be used any time, and is free from the replacement of batteries and does not present problems arising from the disposal of batteries.

A non-rechargeable battery may be used as the charging circuit 100, 101, 102 or 103, and when an electronic device is left unused is not carried for a long period of time, the electronic device may be immediately operated from power from the battery, and as a user carries the electronic device, power is generated, allowing the electronic device to operate.

[8.2] Second Modification

In each of the above embodiments, the closed loop path is formed by turning on the P-channel FETs P1 and P2. Alternatively, a closed loop path may be formed by turning on the N-channel FETs N1 and N2.

[8.3] Third Modification

In each of the above embodiments, unipolar transistors, such as P-channel FETs P1 and P2 and N-channel FETs N1 and N2, are employed as switching means. Alternatively, P-channel FETs P1 and P2 may be replaced with PNP transistors, and N-channel FETs N1 and N2 may be replaced with NPN bipolar transistors. In these bipolar transistors, the saturation voltage between emitter and collector is typically 0.3 V, and when the voltage generated by the generator AG is small, FETs are preferable as in the above embodiments.

[8.4] Fourth Modification

In the above-referenced embodiments, comparators COM1A, COM1B, COM2A, and COM2B may respectively be constructed of FETs, and each of the charging circuits 100, 101, 102, and 103 may be formed in an one chip integrated circuit.

The use of parasitic diodes D1–D4 of integrated P-channel FET P1, P-channel FET P2, N-channel FET N1 and N-channel FET N2 allows the rectification operation to continue even when the comparators fail to work with the power source voltage dropping.

[8.5] Fifth Modification

In the above embodiments, the generator AG is an electromagnetic generator in which the rotary motion of the oscillating weight 7 is transferred to the rotor 10, and the electromotive force is generated in the output coil in response to the rotation of the rotor 10. The present invention is not limited this. For example, acceptable as the generator AG may be the one in which a rotary motion, caused by a restoring force, generates an electromotive force, or the one in which external or self-oscillating, vibration or displacement, is applied to a piezo-electric body to generate power through the piezo-electric effect. In other words, any generator generating AC power works.

[8.6] Sixth Modification

In each of the above embodiments, a charging circuit may be arranged with the high-voltage side power line VDD and the low-voltage side power line $V_{SS}$, reversed.

[8.7] Seventh Modification

The charging circuit in each of the above embodiments and the charging circuits in the above modifications may be incorporated in an electronically-controlled mechanical watch having a generator with a mainspring.

FIG. 21 is a perspective view showing the mechanical structure of the electronically-controlled mechanical watch.

In this wristwatch, a mainspring 110 is connected to a crown (not shown). By winding the crown, mechanical energy is stored in the mainspring 110. Accelerating train wheels 120 are arranged between the mainspring 110 and a rotor 131 of a generator 130. The accelerating train wheels 120 include center wheel and pinion 121, to which a minute hand 124 is connected, third wheel and pinion 122, and second wheel and pinion 123, to which a second hand 125 is connected. The accelerating train wheels 120 transfer the motion of the mainspring 110 to the rotor 131 of the generator 130 to cause the generator 130 to generate power. The generator 130 works as an electromagnetic brake to cause the hands connected to the accelerating train wheels 120 to rotate at a constant speed. In this sense, the generator 130 also works as a governor.

FIG. 22 is an electrical block diagram showing the electronically-controlled mechanical watch, in which the charging circuit 100A, having a structure identical to that of the charging circuit 100 of the first embodiment, is incorporated.

Referring to FIG. 22, the charging circuit 100A includes the generator 130 and the rectifier 135.

An oscillator circuit 160 generates a clock signal CLK using a crystal oscillator 161. When a detector circuit 102 in a governor circuit 170 detects a frequency of a generated signal of the generator 130, a control circuit 103 controls a closed loop forming section 140, by adjusting the electromagnetic brake in accordance with the frequency detection result to make the rotational period of the rotor 131 coincide with the period of the clock signal CLK and to keep constant the rotational speed of the rotor 131.

To control the generator 130 in its rotation, the closed loop forming section 140 switches on and off a closed loop path formed between both terminals of a coil of the AC generator AG. This switching function is performed by the P-channel transistors MP1 and MP2 in the above-referenced embodiments. In this choppering, a short-circuit braking is applied to the AC generator AG at a switch-on, and electric energy is stored in the coil of the AC generator AG. At a switch-off, the AC generator AG operates, releasing the electric energy stored in the coil, and thereby generating an voltage. Since the electric energy at the switch-off is added to this voltage, its magnitude is increased. For this reason, if the AC generator AG is controlled in the choppering, a drop in generated power at the braking is compensated for by an increase in voltage during the switch-off. Damping torque is increased while the generated power is maintained above a constant level. A long-operating-time electronically-controlled mechanical watch is thus provided. Since the switching for the choppering operation may also carried out by the P-channel transistors MP1 and MP2, the construction of the watch is simplified.

[8.8] Eighth Modification

The closed loop path is formed by a short-circuit. Alternatively, a resistor may be added in series. In this case, a loop current flowing through the loop may be set to an optimum value.

Industrial Applicability

In accordance with the present invention, as discussed above, a predetermined pair of transistor pair, out of the four rectifying transistors connected in a bridge, is turned on when a charge voltage exceeds a predetermined voltage so that the closed loop path is formed to allow the generated current to flow therethrough. With a simple arrangement, the overcharging of the charged device is prevented.

Since the other transistor pair remains off when the closed loop path is formed, no short-circuit current takes place from the charged device, the power stored in the high-capacitance capacitor C is not consumed in vain, and the circuits are protected against damage.

Since the other transistor pair is turned off prior to turning on the predetermined transistor pair in the formation of the closed loop path, the closed loop path is reliably formed, and the charged device is reliably prevented from being overcharged.

Since the other transistor pair is turned on with the predetermined transistor pair off in the formation of the closed loop path, the charged device is reliably prevented from being overcharged.

Since MOSFETs for the rectifying bridge circuit also serve as MOSTFETs for the overcharge prevention circuit, available space of the electronic device, such as a wristwatch, in which space saving requirement is rigorous, is fully exploited, and the manufacturing cost for the device is also reduced.

What is claimed is:

1. An overcharge prevention method for a voltage storage element connected to a bridge rectifier circuit comprising a first switching section connected between a first input terminal supplied with an AC voltage and a first power source line, a second switching section connected between a second input terminal supplied with the AC voltage and the first power source line, a third switching section connected between the first input terminal and a second power source line, and a fourth switching section connected between the second input terminal and the second power source line, the method comprising:

concurrently switching on one of:
both the first and second switching sections, and
both the third and fourth switching sections,
to form a closed loop path between the first input terminal and the second input terminal.

2. An overcharge prevention method according to claim 1, wherein the first and second switching sections comprise P-channel MOSFETs, and wherein the third and fourth switching sections comprise N-channel MOSFETs.

3. An overcharge prevention method used in a charging circuit which rectifies an AC voltage supplied to input terminals to charge a voltage storage element with power, the charging circuit comprising a first comparator section for comparing a terminal voltage at a first input terminal supplied with the AC voltage with an output voltage at a first power source line, a first switching section, which is connected between the first power source line and the first input terminal, and is turned on and off in response to the first comparator section, a second comparator section for comparing a terminal voltage at a second input terminal with the output voltage at the first power source line, a second switching section, which is connected between the first power source line and the second input terminal, and is turned on and off in response to the second comparator section, a third comparator section for comparing the terminal voltage supplied to the first input terminal with an output voltage at a second power source line, a third switching section, which is connected between the second power source line and the first input terminal, and is turned on and off in response to the third comparator section, a fourth comparator section for comparing the terminal voltage supplied to the second input terminal with the output voltage at the second power source line, a fourth switching section, which is connected between the second power source line and the second input terminal, and is turned on and off in response to the fourth comparator section, and the voltage storage element connected between the first power source line and the second power source line, wherein said overcharge prevention method comprises the steps of:

(a) detecting the voltage charged at the voltage storage element, (b) determining whether the detected charge voltage exceeds a predetermined voltage, (c) turning off one of:
both the first and second switching sections, and
both the third and fourth switching sections,
when the charge voltage exceeds the predetermined voltage, and (d) forming a closed loop path between the first input terminal and the second input terminal, by concurrently turning on one of:
both the first and second switching sections, and
both the third and fourth switching sections.

4. An overcharge prevention method according to claim 3, wherein in step (b), the predetermined voltage is a reference voltage.

5. An overcharge prevention method according to claim 3, wherein, in step (d), both the first and second switching sections are turned on.

6. An overcharge prevention method according to claim 5, wherein, in step (d), both the first and second switching sections are turned on, subsequent to turning off both the third and fourth switching sections.

7. An overcharge prevention method according to one of claims 5 and 6, further comprising the step of returning both the third and fourth switching sections to a normal charging operation, subsequent to retiring both the first and second switching sections to a normal charging operation, when the first, second, third and fourth switching sections are returned to the normal charging operation.

8. An overcharge prevention method according to claim 3, wherein, in step (d), both the first and second switching sections are turned on with both the third and fourth switching sections remaining in an off state.

9. An overcharge prevention method according to claim 3, wherein, in step (d), both the third and fourth switching sections are turned on.

10. An overcharge prevention method according to claim 9, wherein, in step (d), both the third and fourth switching sections are turned on, subsequent to turning off both the first and second switching sections.

11. An overcharge prevention method according to one of claim 9 or 10, further comprising the step of returning both the first and second switching sections to a normal charging operation, subsequent to returning both the third and fourth switching sections to a normal charging operation, when the first, second, third and fourth switching sections are returned to the normal charging operation.

12. An overcharge prevention method according to claim 3, wherein, in step (d), both the third and fourth switching sections are turned on with both the first and second switching sections remaining in an off state.

13. An overcharge prevention method according to claim 3, wherein, in step (a), the detection of the charge voltage is intermittently performed at a predetermined sampling period.

14. A charging circuit comprising:
a bridge rectifier circuit comprising:
first switching means connected between a first input terminal supplied with an AC voltage and a first power source line,
second switching means connected between a second input terminal supplied with the AC voltage and the first power source line,
third switching means connected between the first input terminal and a second power source line, and
fourth switching means connected between the second input terminal and the second power source line,
a voltage storage element connected to said bridge rectifier circuit; and closed loop forming means that forms a closed loop path between the first input terminal and the second input terminal, by concurrently turning on one of:
both the first and second switching means, and
both the third and fourth switching means.

15. A charging circuit according to claim 14, wherein the closed loop forming means concurrently turns on one of
both the first and second switching means subsequent to turning off both the third and fourth switching means, and
both the third and fourth switching means subsequent to turning off both the first and second switching means.

16. A charging circuit for charging a voltage storage element arranged between a first power source line and a second power source line by rectifying an AC voltage supplied between first and second input terminals, the charging circuit comprising:
first comparator means for comparing a terminal voltage supplied to the first input terminal with an output voltage at the first power source line;
first switching means, which is coupled between the first power source line and the first input terminal, and is turned on and off in response to said first comparator means;
second comparator means for comparing a terminal voltage supplied to the second input terminal with the output voltage at the first power source line;
second switching means, which is coupled between the first power source line and the second input terminal, and is turned on and off in response to said second comparator means;
third comparator means for comparing the terminal voltage supplied to the first input terminal with an output voltage at the second power source line;
third switching means, which is coupled between the second power source line and the first input terminal, and is turned on and off in response to said third comparator means;
fourth comparator means for comparing the terminal voltage supplied to the second input terminal with the output voltage at the second power source line;
fourth switching means, which is coupled between the second power source line and the second input terminal, and is turned on and off in response to said fourth comparator means;
a voltage storage element, which is coupled between the first power source line and the second power source line, and is charged with a charging current rectified through said first, second, third and fourth switching means;
predetermined voltage comparator means for detecting a voltage charged at said voltage storage element and for determining whether the detected charge voltage exceeds a predetermined voltage; and
closed loop forming means, which forms a closed loop path between the first input terminal and the second input terminal by turning off both said third and fourth switching means and by turning on both said first and second switching means, in response to the detection result by said predetermined voltage comparator means.

17. A charging circuit according to claim 16, wherein said predetermined voltage is a reference voltage.

18. A charging circuit according to claim 16, wherein said closed loop forming means comprises:

first control signal generating means for generating a first control signal for turning on both said first and second switching means when said predetermined voltage comparator means detects that the charge voltage exceeds the predetermined voltage;
second control signal generating means for generating a second control signal for turning off both said third and fourth switching means prior to turning on said first and second switching means;
first gating means, coupled between said first comparator means and said first switching means, for turning on said first switching means in response to the first control signal;
second gating means, coupled between said second comparator means and said second switching means, for turning on said second switching means in response to the first control signal:
third gating means, coupled between said third comparator means and said third switching means, for turning off said third switching means in response to the second control signal; and
fourth gating means, coupled between said fourth comparator means and said fourth switching means, for turning off said fourth switching means in response to the second control signal.

19. A charging circuit according to claim 16, wherein said closed loop forming means comprises:
control signal generating means for generating a control signal for turning on both said first and second switching means and for turning off both said third and fourth switching means, when said predetermined voltage comparator means detects that the charge voltage exceeds the predetermined voltage;
first gating means, coupled between said first comparator means and said first switching means, for turning on said first switching means in response to the control signal;
second gating means, coupled between said second comparator means and said second switching means, for turning on said second switching means in response to the control signal;
third gating means, coupled between said third comparator means and said third switching means, for turning off said third switching means in response to the control signal;
fourth gating means, coupled between said fourth comparator means and said fourth switching means, for turning off said fourth switching means in response to the control signal;
fifth gating means for supplying said first gating means with the control signal when said third switching means is in an off state; and
sixth gating means for supplying said second gating means with the control signal when said fourth switching means is in an off state.

20. A charging circuit according to claim 16, wherein each said switching means comprises a transistor.

21. A charging circuit according to claim 20, further comprising a parasitic diode connected in parallel with each said transistor.

22. A charging circuit according to claim 16, wherein the AC power supplied to the first and second input terminals is generated by a generator which comprises an oscillating weight that turns and a generating element for generating an electromotive force in response to the turning motion of the oscillating weight.

23. A charging circuit according to claim 16, wherein the AC power supplied to the first and second input terminals is generated by a generator which comprises an elastic member to which a deforming force is exerted, rotary means that is rotated by a restoring force that takes place when said elastic member restores to an original shape, and a generating element that generates an electromotive force in response to the rotary motion of said rotary means.

24. A charging circuit according to claim 16, wherein the AC power supplied to the first and second input terminals is generated by a generator which comprises a piezoelectric element that generates an electromotive force by means of the piezoelectric effect in response to a displacement applied thereto.

25. A charging circuit according to claim 16, wherein said predetermined voltage comparator means intermittently detects a voltage charged at said voltage storage element at a predetermined sampling period.

26. An electronic device comprising:
   a generator for generating an AC power,
   a charging circuit comprising:
      first comparator means for comparing a terminal voltage supplied to a first input terminal with an output voltage at a first power source line;
      first switching means, which is coupled between the first power source line and the first input terminal, and is turned on and off in response to said first comparator means;
      second comparator means for comparing a terminal voltage supplied to a second input terminal with the output voltage at the first power source line;
      second switching means, which is coupled between the first power source line and the second input terminal, and is turned on and off in response to said second comparator means;
      third comparator means for comparing the terminal voltage supplied to the first input terminal with an output voltage at a second power source line;
      third switching means, which is coupled between the second power source line and the first input terminal, and is turned on and off in response to said third comparator means;
      fourth comparator means for comparing the terminal voltage supplied to the second input terminal with the output voltage at the second power source line;
      fourth switching means, which is coupled between the second power source line and the second input terminal, and is turned on and off in response to said fourth comparator means,
      a voltage storage element, which is coupled between the first power source line and the second power source line, and is charged with a charging current rectified through said first, second, third and fourth switching means;
      predetermined voltage comparator means for detecting a voltage charged at said voltage storage element and for determining whether the detected charge voltage exceeds a predetermined voltage; and
      closed loop forming means which forms a closed loop path between the first input terminal and the second input terminal by turning off both said third and fourth switching means and by turning on both said first and second switching means, in response to a detection result by said predetermined voltage comparator means; and
   a processing circuit operated from the power supplied by said voltage storage element.

27. An electronic device according to claim 26, wherein said predetermined voltage is a reference voltage.

28. An electronic device according to claim 26, wherein said predetermined voltage comparator means intermittently detects a voltage charged at said voltage storage element at a predetermined sampling period.

29. A timepiece comprising:
   a generator for generating an AC power,
   a charging circuit comprising first comparator means for comparing a terminal voltage supplied to a first input terminal with an output voltage at a first power source line, first switching means, which is connected between the first power source line and the first input terminal, and is turned on and off in response to said first comparator means, second comparator means for comparing a terminal voltage supplied to a second input terminal with the output voltage at the first power source line, second switching means, which is connected between the first power source line and the second input terminal, and is turned on and off in response to said second comparator means, third comparator means for comparing the terminal voltage supplied to the first input terminal with an output voltage at a second power source line, third switching means, which is connected between the second power source line and the first input terminal, and is turned on and off in response to said third comparator means, fourth comparator means for comparing the terminal voltage supplied to the second input terminal with the output voltage at the second power source line, fourth switching means, which is connected between the second power source line and the second input terminal, and is turned on and off in response the second input terminal with the output voltage at the second power source line, fourth switching means, which is connected between the second power source line and the second input terminal, and is turned on and off in response to said fourth comparator means, a voltage storage element, which is connected between the first power source line and the second power source line, and is charged with a charging current rectified through said first, second, third and fourth switching means, predetermined voltage comparator means, which detects a voltage charged at said voltage storage element and determines whether the detected charge voltage exceeds a predetermined voltage, and closed loop forming means which forms a closed loop path between the first input terminal and the second input terminal by turning off both said third and fourth switching means and by turning on both said first and second switching means, in response to the detection result by said predetermined voltage comparator means, and
   a time measurement circuit, operated from the power supplied from said voltage storage element, for measuring time.

30. A timepiece according to claim 29, wherein said predetermined voltage is a reference voltage.

31. A timepiece according to claim 29, wherein said predetermined voltage comparator means intermittently detects a voltage charged at said voltage storage element at a predetermined sampling period.

32. A charging circuit comprising:
   a bridge rectifier circuit comprising:
      a first switch connected between a first input terminal supplied with an AC voltage and a first power source line,
      a second switch connected between a second input terminal supplied with the AC voltage and the first power source line, a third switch connected between the first input terminal and a second power source line, and a fourth switch connected between the second input terminal and the second power source line;

a voltage storage element connected to said bridge rectifier circuit; and a closed loop forming circuit that forms a closed loop path between the first input terminal and the second input terminal, by concurrently turning on one of:

both the first and second switches, and both the third and fourth switches.

33. A charging circuit according to claim 32, wherein the closed loop forming circuit concurrently turns on one of both the first and second switches subsequent to turning off both the third and fourth switches, and both the third and fourth switches subsequent to turning off both the first and second switches.

34. A charging circuit for charging a voltage storage element arranged between a first power source line and a second power source line, with charge, by rectifying an AC voltage supplied between first and second input terminals, the charging circuit comprising:

a first comparator to compare a terminal voltage supplied to the first input terminal with an output voltage at the first power source line;

a first switch, which is coupled between the first power source line and the first input terminal, and is turned on and off in response to said first comparator;

a second comparator to compare a terminal voltage supplied to the second input terminal with the output voltage at the first power source line;

a second switch, which is coupled between the first power source line and the second input terminal, and is turned on and off in response to said second comparator;

a third comparator to compare the terminal voltage supplied to the first input terminal with an output voltage at the second power source line;

a third switch, which is coupled between the second power source line and the first input terminal, and is turned on and off in response to said third comparator;

a fourth comparator to compare the terminal voltage supplied to the second input terminal with the output voltage at the second power source line;

a fourth switch, which is coupled between the second power source line and the second input terminal, and is turned on and off in response to said fourth comparator;

a voltage storage element, which is coupled between the first power source line and the second power source line, and is charged with a charging current rectified through said first, second, third and fourth switches;

a predetermined voltage comparator to detect a voltage charged at said voltage storage element and to determine whether the detected charge voltage exceeds a predetermined voltage; and a closed loop forming circuit, which forms a closed loop path between the first input terminal and the second input terminal by turning off both said third and fourth switches and by turning on both said first and second switches, in response to the detection result by said predetermined voltage comparator.

35. A charging circuit according to claim 34, wherein said predetermined voltage is a reference voltage.

36. A charging circuit according to claim 34, wherein said closed loop forming circuit comprises:

a first control signal generator to generate a first control signal to turn on both said first and second switches when said predetermined voltage comparator detects that the charge voltage exceeds the predetermined voltage;

a second control signal generator to generate a second control signal to turn off both said third and fourth switches prior to turning on both said first and second switches;

a first gate, coupled between said first comparator and said first switch, to turn on said first switch in response to the first control signal;

a second gate, coupled between said second comparator and said second switch, to turn on said second switch in response to the first control signal;

a third gate, coupled between said third comparator and said third switch, to turn off said third switch in response to the second control signal; and a fourth gate, coupled between said fourth comparator and said fourth switch, to turn off said fourth switch in response to the second control signal.

37. A charging circuit according to claim 34, wherein said closed loop forming circuit comprises:

a control signal generator to generate a control signal to turn on both said first and second switches and to turn off both said third and fourth switches, when said predetermined voltage comparator detects that the charge voltage exceeds the predetermined voltage;

a first gate, coupled between said first comparator and said first switch, to turn on said first switch in response to the control signal;

a second gate, coupled between said second comparator and said second switch, to turn on said second switch in response to the control signal;

a third gate, coupled between said third comparator and said third switch, to turn off said third switch in response to the control signal;

a fourth gate, coupled between said fourth comparator and said fourth switch, to turn off said fourth switch in response to the control signal;

a fifth gate to supply said first gate with the control signal when said third switch is in an off state; and a sixth gate to supply said second gate with the control signal when said fourth switch is in an off state.

38. A charging circuit according to claim 34, wherein each said switch comprises a transistor.

39. A charging circuit according to claim 38, further comprising a parasitic diode connected in parallel with each said transistor.

40. A charging circuit according to claim 34, wherein the AC power supplied to the first and second input terminals is generated by a generator which comprises an oscillating weight that turns and a generating element to generate an electromotive force in response to the turning motion of the oscillating weight.

41. A charging circuit according to claim 34, wherein the AC power supplied to the first and second input terminals is generated by a generator which comprises an elastic member to which a deforming force is exerted, a rotor that is rotated by a restoring force that takes place when said elastic member restores to an original shape, and a generating element that generates an electromotive force in response to the rotary motion of said rotor.

42. A charging circuit according to claim 34, wherein the AC power supplied to the first and second input terminals is generated by a generator which comprises a piezoelectric element that generates an electromotive force by means of the piezoelectric effect in response to a displacement applied thereto.

43. A charging circuit according to claim 34, wherein said predetermined voltage comparator intermittently detects a voltage charged at said voltage storage element at a predetermined sampling period.

44. An electronic device comprising:
a generator to generate an AC power,
a charging circuit comprising:
  a first comparator to compare a terminal voltage supplied to a first input terminal with an output voltage at a first power source line;
  a first switch, which is coupled between the first power source line and the first input terminal, and is turned on and off in response to said first comparator;
  a second comparator to compare a terminal voltage supplied to a second input terminal with the output voltage at the first power source line;
  a second switch, which is coupled between the first power source line and the second input terminal, and is turned on and off in response to said second comparator;
  a third comparator to compare the terminal voltage supplied to the first input terminal with an output voltage at a second power source line;
  a third switch, which is coupled between the second power source line and the first input terminal, and is turned on and off in response to said third comparator;
  a fourth comparator to compare the terminal voltage supplied to the second input terminal with the output voltage at the second power source line;
  a fourth switch, which is coupled between the second power source line and the second input terminal, and is turned on and off in response to said fourth comparator,
  a voltage storage element, which is coupled between the first power source line and the second power source line, and is charged with a charging current rectified through said first, second, third and fourth switches;
  a predetermined voltage comparator to detect a voltage charged at said voltage storage element and to determine whether the detected charge voltage exceeds a predetermined voltage; and
  a closed loop forming circuit which forms a closed loop path between the first input terminal and the second input terminal by turning off both said third and fourth switches and by turning on both said first and second switches, in response to a detection result by said predetermined voltage comparator; and
a processing circuit operated from the power supplied by said voltage storage element.

45. An electronic device according to claim 44, wherein said predetermined voltage is a reference voltage.

46. An electronic device according to claim 44, wherein said predetermined voltage comparator intermittently detects a voltage charged at said voltage storage element at a predetermined sampling period.

47. A timepiece comprising:
a generator to generate an AC power,
a charging circuit comprising:
  a first comparator to compare a terminal voltage supplied to a first input terminal with an output voltage at a first power source line;
  a first switch, which is coupled between the first power source line and the first input terminal, and is turned on and off in response to said first comparator;
  a second comparator to compare a terminal voltage supplied to a second input terminal with the output voltage at the first power source line;
  a second switch, which is coupled between the first power source line and the second input terminal, and is turned on and off in response to said second comparator;
  a third comparator to compare the terminal voltage supplied to the first input terminal with an output voltage at a second power source line;
  a third switch, which is coupled between the second power source line and the first input terminal, and is turned on and off in response to said third comparator;
  a fourth comparator to compare the terminal voltage supplied to the second input terminal with the output voltage at the second power source line;
  a fourth switch, which is coupled between the second power source line and the second input terminal, and is turned on and off in response to said fourth comparator;
  a voltage storage element, which is coupled between the first power source line and the second power source line, and is charged with a charging current rectified through said first, second, third and fourth switches;
  a predetermined voltage comparator to detect a voltage charged at said voltage storage element and to determine whether the detected charge voltage exceeds a predetermined voltage; and
  a closed loop forming circuit which forms a closed loop path between the first input terminal and the second input terminal by turning off both said third and fourth switches and by turning on both said first and second switches, in response to a detection result by said predetermined voltage comparator; and
a time measurement circuit, operated from the power supplied from said voltage storage element, for measuring time.

48. A timepiece according to claim 47, wherein said predetermined voltage is a reference voltage.

49. A timepiece according to claim 47, wherein said predetermined voltage comparator intermittently detects a voltage charged at said voltage storage element at a predetermined sampling period.

50. An electronic device comprising:
a charging circuit comprising:
  a bridge rectifier circuit comprising:
    a first switch connected between a first input terminal supplied with an AC voltage and a first power source line,
    a second switch connected between a second input terminal supplied with the AC voltage and the first power source line,
    a third switch connected between the first input terminal and a second power source line, and
    a fourth switch connected between the second input terminal and the second power source line;
  a voltage storage element connected to said bridge rectifier circuit;
  a closed loop forming circuit that forms a closed loop path between the first input terminal and the second input terminal, by concurrently turning on one of: both the first and second switches, and both the third and fourth switches; and a processing circuit operated from power supplied by the voltage storage element.

51. A new electronic device according to claim 50, wherein the closed loop forming circuit concurrently turns on one of both the first and second switches subsequent to turning off both the third and fourth switches, and both the third and fourth switches subsequent to turning off both the first and second switches.

52. A timepiece comprising:

a charging circuit comprising:
- a bridge rectifier circuit comprising:
  - a first switch connected between a first input terminal supplied with an AC voltage and a first power source line,
  - a second switch connected between a second input terminal supplied with the AC voltage and the first power source line,
  - a third switch connected between the first input terminal and a second power source line, and
  - a fourth switch connected between the second input terminal and the second power source line;
- a voltage storage element connected to said bridge rectifier circuit;
- a closed hoop forming circuit that forms a closed hoop path between the first input terminal and the second input terminal, by concurrently turning on one of:
  - both the first and second switches, and
  - both the third and fourth switches; and
- a time measurement circuit that measures time and is operated from power supplied from the voltage storage element.

53. A timepiece according to claim 52, wherein the closed loop forming circuit concurrently turns on one of both the first and second switches subsequent to turning off both the third and fourth switches, and both the third and fourth switches subsequent to turning off both the first and second switches.

* * * * *

UNITED STATES PATENT AND TRADEMARK OFFICE
CERTIFICATE OF CORRECTION

PATENT NO.   : 6,373,790 B1
DATED        : April 16, 2002
INVENTOR(S)  : Teruhiko Fujisawa It is certified that error appears in the above-identified patent and that said Letters Patent is hereby corrected as shown below:

Column 24,
Line 24, change "retiring" to -- returning --.
Line 40, change "claim" to -- claims --.

Column 26,
Line 17, change ":" to -- ; --.

Column 28,
Line 33, after "response" delete "the second input terminal with the output voltage at the second power source line, fourth switching means, which is connected between the second power source line and the second input terminal, and is turned on and off in response".

Signed and Sealed this

Twenty-ninth Day of October, 2002

*Attest:*

*Attesting Officer*

JAMES E. ROGAN
*Director of the United States Patent and Trademark Office*